(12) United States Patent
Kubo et al.

(10) Patent No.: US 10,773,755 B2
(45) Date of Patent: Sep. 15, 2020

(54) HAT MEMBER

(71) Applicant: Nippon Steel Corporation, Tokyo (JP)

(72) Inventors: Masahiro Kubo, Tokyo (JP); Yoshiaki Nakazawa, Tokyo (JP); Naruhiko Nomura, Tokyo (JP); Toshiya Suzuki, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 16/495,671

(22) PCT Filed: Mar. 20, 2018

(86) PCT No.: PCT/JP2018/011149
§ 371 (c)(1),
(2) Date: Sep. 19, 2019

(87) PCT Pub. No.: WO2018/174082
PCT Pub. Date: Sep. 27, 2018

(65) Prior Publication Data
US 2020/0094885 A1 Mar. 26, 2020

(30) Foreign Application Priority Data

Mar. 24, 2017 (JP) .................. 2017-058539

(51) Int. Cl.
*B62D 29/00* (2006.01)
*C21D 9/00* (2006.01)
*B60J 5/04* (2006.01)
*B62D 21/15* (2006.01)
*B62D 25/02* (2006.01)
(Continued)

(52) U.S. Cl.
CPC ......... *B62D 29/007* (2013.01); *C21D 9/0068* (2013.01); *B60J 5/042* (2013.01);
(Continued)

(58) Field of Classification Search
None
See application file for complete search history.

(56) References Cited

U.S. PATENT DOCUMENTS

2012/0319431 A1 12/2012 Bodin et al.
2014/0356643 A1* 12/2014 Nakata .................. B21D 24/06
428/603

(Continued)

FOREIGN PATENT DOCUMENTS

JP         H1017933 A      1/1998
JP         2009274590 A    11/2009
(Continued)

OTHER PUBLICATIONS

Mori et al., Journal of the JSTP vol. 50 No. 586 (Nov. 2009), pp. 1049-1053, Local Die Quenching in Hot Stamping for Ultra High Strength Steel Formed Products Having Strength Distribution.
(Continued)

*Primary Examiner* — Adam Krupicka
(74) *Attorney, Agent, or Firm* — Banner & Witcoff, Ltd.

(57) ABSTRACT

A hat member 1 includes a top-plate portion 13, first ridges 113, and two side walls 11. The two side walls have a middle hardness Dc of 300 HV or higher. Each of the two side walls 11 includes a softened portion L and a strength-transition portion T adjacent to the softened portion L. The softened portion L has a hardness Dn lower than the middle hardness Dc by at least 8% (Dc−Dn≥0.08Dc). The strength-transition portion T extends 0.5 mm or longer from the softened portion L toward the first end of the side wall. The strength-transition portion T has a hardness Dt that transitionally changes within the range of 8% to 1% lower than the middle hardness Dc (0.92Dc≤Dt≤0.99Dc). The hat member 1 further includes two second ridges 114 and two flanges 14.

6 Claims, 18 Drawing Sheets

(51) Int. Cl.
  *B62D 25/04* (2006.01)
  *B62D 25/06* (2006.01)
  *B62D 25/08* (2006.01)
  *B62D 25/20* (2006.01)

(52) U.S. Cl.
  CPC .............. *B62D 21/15* (2013.01); *B62D 25/02* (2013.01); *B62D 25/04* (2013.01); *B62D 25/06* (2013.01); *B62D 25/08* (2013.01); *B62D 25/20* (2013.01)

(56) References Cited

U.S. PATENT DOCUMENTS

2015/0377555 A1* 12/2015 Ishiguro .............. F27B 17/0075 148/565
2016/0175910 A1 6/2016 Luetkemeyer et al.

FOREIGN PATENT DOCUMENTS

| | | |
|---|---|---|
| JP | 2011173166 A | 9/2011 |
| JP | 2014524979 A | 9/2014 |
| JP | 5894081 B2 | 3/2016 |
| WO | 2013137454 A1 | 9/2013 |

OTHER PUBLICATIONS

English Abstract & Family List of JP2014524979A.
English Abstract & Family List of WO2013137454A1.
English Abstract & Family List of JP2011173166A.
English Abstract & Family List of JP5894081B2.
English Abstract & Family List of JPH1017933A.
English Abstract & Family List of JP2009274590A.

* cited by examiner comparative example 1
(strength distribution type = N)

inventive example 1
(strength distribution type = V, Lt = 1.0t)

comparative example 3
(strength distribution type = F)

inventive example 4
(strength distribution type = P, Lt = 1.0t)

Cross section on A-A

HAT MEMBER

RELATED APPLICATION DATA

This application is a National Stage Application under 35 U.S.C. 371 of co-pending PCT application number PCT/JP2018/011149 designating the United States and filed Mar. 20, 2018; which claims the benefit of JP application number 2017-058539 and filed Mar. 24, 2017 each of which are hereby incorporated by reference in their entireties.

TECHNICAL FIELD

The present invention relates to a hat member having impact resistance.

BACKGROUND ART

Structural members used to reinforce a vehicle are required to have high strength and light weight. Further, structural members are often required to have impact resistance and exhibit a reduction in the amount of deformation upon an impact. In view of this, one structural member sometimes includes both impact-resistant portions and energy-absorbing portions. To achieve this, the strength distribution in a structural member may include various portions with different strengths.

For example, WO 2013/137454 (Patent Document 1) discloses a hot-pressed molded product that strikes a balance between high strength and the amount of extension for each of its portions, wherein a single molded product is provided with regions representing impact-resistant portions and energy-absorbing portions without application of welding.

JP 2011-173166A (Patent Document 2) discloses a complex press-working apparatus that facilitates creation of separate high-strength portions and low-strength portions within a single press-molded product.

Japanese Patent No. 5894081 discloses a B-pillar for a vehicle. This B-pillar includes a hat-shaped section including a central flange, two web portions, and two side flanges. A hat-shaped section is hot-formed from a flat plate of boron steel and is then hardened. The hat-shaped section has a fracture strength above 1400 MPa. During hardening, some portions of the side flanges are not completely hardened and have a fracture strength below 1100 MPa.

PRIOR ART DOCUMENTS

Patent Documents

Patent Document 1: WO 2013/137454
Patent Document 2: JP 2011-173166A
Patent Document 3: Japanese Patent No. 5894081

SUMMARY OF THE INVENTION

Problems to be Solved by the Invention

The conventional techniques discussed above create different strengths within a single member. However, a further investigation into the strength distribution in a member has yet to be conducted to provide sufficient impact absorbency.

The present application discloses a hat member with a strength distribution that enables efficient absorption of impact energy.

Means for Solving the Problems

A hat member according to an aspect of the present invention includes a top-plate portion, two first ridges each positioned on a respective one of both ends of the top-plate portion, and two side walls each extending from a first end adjacent to the associated first ridge to a second end in a direction with an angle of 90° to 135° relative to the top-plate portion. Each of the two side walls has a middle hardness $D_c$ of 300 HV or higher, where the middle hardness is defined as the lower one of the hardnesses of the two side walls as measured at their middle positions as determined along a direction perpendicular to the top-plate portion. Each of the two side walls includes a softened portion and a strength-transition portion adjacent to the softened portion. The softened portion extends from the second end to a position before the middle position. The softened portion has a hardness $D_n$ lower than the middle hardness $D_c$ by at least 8% ($D_c - D_n \geq 0.08 D_c$). The strength-transition portion is adjacent to the softened portion, and extends 0.5 mm or longer from the softened portion toward the first end and located closer to the second end than a middle between the first end and the second end. The strength-transition portion has a hardness $D_t$ transitionally changing in a range of 8% to 1% lower than the middle hardness $D_c$ ($0.92 D_c \leq D_t \leq 0.99 D_c$). The hat member further includes two second ridges each adjacent to the second end of the associated one of the two side walls and two flanges extending away from each other from the respective second ridges and having a hardness lower than the middle hardness by at least 8%.

"Before the middle position" means any position between the second end and the middle position of a side wall. "Before the middle position" does not include the second end nor the middle position of a side wall.

Effects of the Invention

The present disclosure provides a hat member having a strength distribution that enables efficient absorption of impact energy.

EMBODIMENTS FOR CARRYING OUT THE INVENTION

Figure 1A:
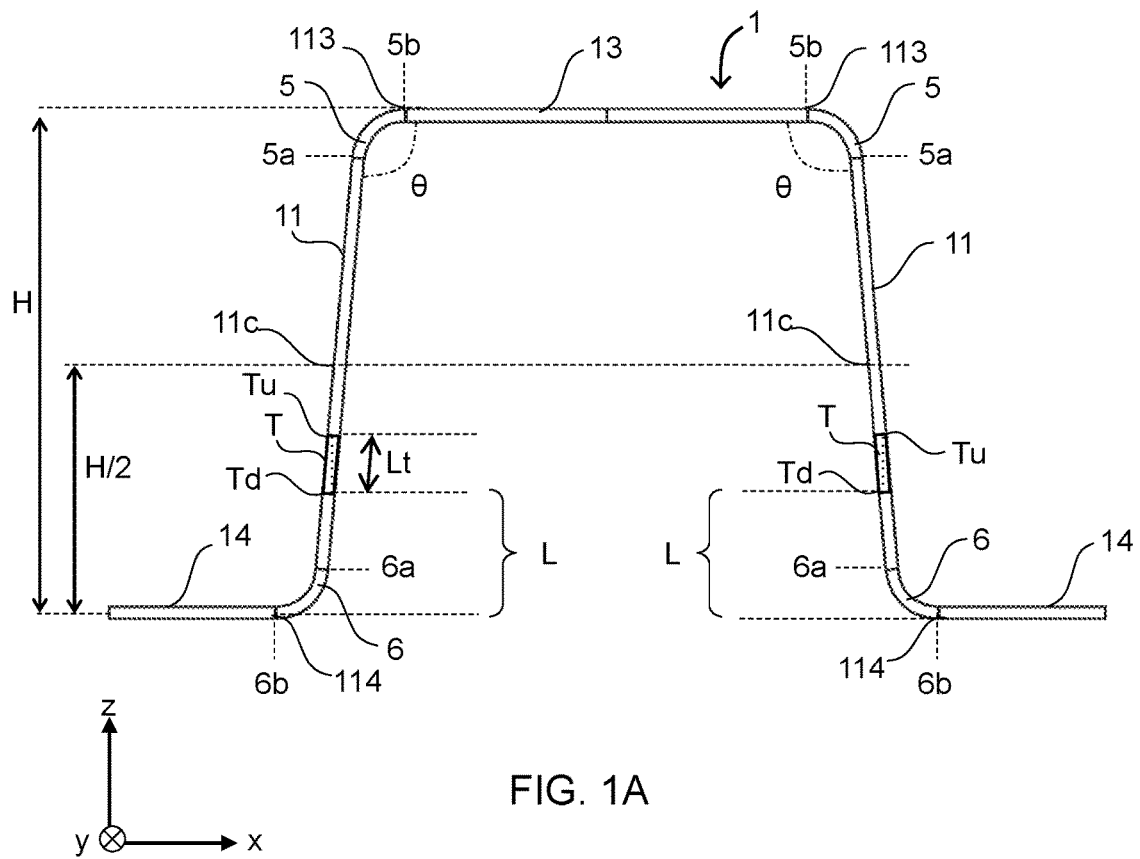
FIG. 1A is a cross-sectional view of a hat member according to an embodiment perpendicular to the longitudinal direction of the hat member.

For example, a structural member used as a vehicle-body structure is required to have high strength and light weight. If the strength of the structural member is increased, the toughness tends to decrease. As such, a structural member with increased strength tends to break at an early stage during a deformation process with multiple stress axes. That is, if the strength of the structural member is high, a brittleness break can easily occur during secondary deformation upon a crash or the like. As a result, a structural member with increased strength may not achieve the desired impact resistance.

For example, a structural member of steel may be subjected to a heat treatment called tempering, to increase its toughness. Generally, if the toughness of a structural member is increased, the strength decreases. This reduces the maximum load on the structural member at the time of crushing. To reduce the decrease in the maximum load while increasing the toughness of the structural member, the inventors carried out partial tempering on structural members under various conditions. Based on this, they found that it is possible to improve both the toughness of the structural member and the maximum load at the time of crushing under certain conditions.

The inventors conducted further research. Specifically, to improve the maximum load at the time of the crush deformation of the hat member, they focused on the deformation mode of the side walls. They attempted to control the deformation mode of the side walls by changing the strengths of some portions of the side walls. After trial and error, they found that the deformation mode can be controlled to improve the maximum load by providing the side walls with strength-transition portions. Based on this finding, they arrived at the structural members of the embodiments described below.

The hat member according to an embodiment of the present invention includes a top-plate portion, two first ridges each positioned on a respective one of both ends of the top-plate portion, and two side walls each extending from a first end adjacent to the associated first ridge to a second end in a direction with an angle of 90° to 135° relative to the top-plate portion. Each of the two side walls has a middle hardness $Dc$ of 300 HV or higher, where the middle hardness is defined as the lower one of the hardnesses of the two side walls as measured at their middle positions as determined along a direction perpendicular to the top-plate portion. Each of the two side walls includes a softened portion and a strength-transition portion adjacent to the softened portion. The softened portion extends from the second end to a position before the middle position. The softened portion has a hardness $Dn$ lower than the middle hardness $Dc$ by at least 8% ($Dc-Dn \geq 0.08Dc$). The strength-transition portion is adjacent to the softened portion, and extends 0.5 mm or longer from the softened portion toward the first end and located closer to the second end than a middle between the first end and the second end. The strength-transition portion has a hardness $Dt$ transitionally changing in a range of 8% to 1% lower than the middle hardness $Dc$ ($0.92Dc \leq Dt \leq 0.99Dc$). The hat member further includes two second ridges each adjacent to the second end of the associated one of the two side walls and flanges extending away from each other from the respective second ridges.

In the above-described arrangement, the two side walls extend in a direction angled at 90 to 135 degrees relative to the top-plate portion. That is, the angle formed by each of the side walls and the direction perpendicular to the top-plate portion is not larger than 45 degrees. In each side wall, as determined from the second ridge adjacent to the associated flange toward the first ridge adjacent to the top-plate portion, a softened portion and a strength-transition portion are arranged in this order and adjacent to each other, located between the second ridge and the middle position of the side wall. The middle hardness of the side wall, measured at the middle position, is 300 HV or higher, and the hardness of the softened portion is lower than the middle hardness by at least 8%. The strength of the strength-transition portion transitionally changes between the hardness level 8% lower than the middle hardness and the hardness level 1% lower than the middle hardness. This strength-transition portion extends 0.5 mm or longer from the softened portion in the direction from the softened portion toward the first end of the side wall. That is, the distance between that end of the strength-transition portion which is located closer to the first ridge and that end which is located closer to the second ridge (i.e. the end contiguous to the softened portion) is 0.5 mm or larger. Providing softened portions and strength-transition portions as described above improves the maximum load upon application of a load in a direction generally perpendicular to the top-plate portion compared with arrangements without such softened portions or strength-transition portions. This provides a hat member with a strength distribution that enables efficient absorption of impact energy.

The above-described arrangement may exhibit a deformation mode where portions of the structural member in and near the strength-transition portions deform relatively easily at the time of crushing of the structural member upon application of a load in a direction generally perpendicular to the top-plate portion. At this time, plastic strains are dispersed by the portions in and near the strength-transition portions to prevent such strains from being concentrated excessively in a narrow region. That is, providing strength-transition portions provides the effect of dispersing plastic strains while controlling the deformation mode. As a result, it is assumed that the maximum load at the time of crushing is increased.

Starting from the above-described arrangement, it is preferable that a width of the strength-transition portion as measured between the end closer to the first ridge and the end closer to the second ridge be not larger than five times an average thickness of the strength-transition portion. Thus, the effects of the strength-transition portion, i.e. control of the deformation mode and dispersion of plastic strains, are more present.

Starting from any one of the above-described arrangements, the width Lt of the strength-transition portion as measured between its end closer to the first ridge and the end closer to the second ridge is preferably not smaller than 1 mm, and more preferably not smaller than 3 mm. This further ensures that the effects of the strength-transition portion, i.e. control of the deformation mode and dispersion of plastic strains, are present. From the same viewpoint, the width Lt of the strength-transition portion as measured between its end closer to the first ridge and the end closer to the second ridge is preferably larger than 0.5 times the average thickness t of the strength-transition portion (Lt>0.5t), and more preferably not smaller than 1.0 times (Lt≥1.0t), and yet more preferably not smaller than 3.0 times (Lt≥3.0t).

Starting from any one of the above-described arrangements, the rate of change in the hardness of the strength-transition portion from the second end toward the first end of each side wall is preferably 3 to 100 HV/mm. This is because, if the rate of change in hardness is above 100 HV/mm, strains are tend to be concentrated in the strength-transition portions, which can easily cause a break; on the other hand, if the rate of change in hardness is smaller than 3 HV/mm, sufficient deformation is hard to occur in the strength-transition portions.

In each of the two side walls, the hardness of the portions other than the softened portion and strength-transition portion and including the middle position may be equal to the middle hardness. That is, in each of the two side walls, the portions other than the softened portion and strength-transition portion and including the middle position may be a high-strength portion with a hardness of 300 HV or higher. Alternatively, a softened portion with a hardness lower than the middle hardness by at least 8% may be provided between the middle position and the first ridge.

The hardness of the two flanges may be lower than the middle hardness by at least 8%. For example, the softened portion of each side wall may extend from the associated flange through the associated second ridge to a position before the middle position of the side wall. In such implementations, the softened portion may be present throughout the flange, or may be present in part of the flange.

A structural member with a closed-cross-section structure including the above-described hat member and a closing plate joined to the flanges of the hat member is also encompassed by the embodiments of the present invention.

The hat member may be curved to protrude from the top-plate portion. Further, a vehicle-body structure, a center pillar (B-pillar) and a reinforcement therefor or a bumper and a reinforcement therefor including the above-described hat member are encompassed by the embodiments of present invention.

As used herein, HV is the unit of Vickers hardness. As used herein, the hardness of a hat member is the Vickers hardness measured by the test method of JIS (Japanese Industrial Standards) Z 2244. The Vickers hardness may be converted to tensile strength or yield strength. As used herein, hardness means Vickers hardness.

A method of manufacturing any one of the above-described hat members is one embodiment of the present invention. A method of manufacturing a hat member according to an embodiment of the present invention is a method of manufacturing one of the above-described hat members by performing press forming on a blank using a punch and a die. This manufacture method includes: heating the blank to 900° C. or higher and soaking and holding the blank at 900° C. or higher for one minute or longer; forming the first ridges by causing a die shoulder (die ridge) of the die and a plate-holding face (i.e. front face) of the punch to pass close by each other when the blank, in contact with the die shoulder, is at a temperature not lower than 600° C. and not higher than 800° C.; and causing a position on the die at a height of half that of a lateral wall of the die and the plate-holding face of the punch to pass close by each other when the blank, in contact with the position on the die at a height of half that of the lateral wall of the die, is at a temperature not lower than 300° C. and not higher than 700° C.

For example, the die shoulder and the plate-holding face of the punch may be caused to pass close by each other when the blank is at a temperature of 600 to 800° C. and, thereafter, the relative velocity between the die and the punch may be reduced; then, when the temperature of the blank has dropped into the range of 300 to 700° C., the position on the die at a height of half that of a lateral wall of the die and the plate-holding face of the punch may be caused to pass close by each other. Alternatively, the die shoulder and the plate-holding face of the punch may be caused to pass close by each other when the blank is at a temperature of 600 to 800° C. and, thereafter, the punch and die may be moved away from each other and then the die shoulder and the plate-holding face of the punch may again be caused to pass close by each other; then, when the temperature of the blank has dropped into the range of 300 to 700° C., the position on the die at a height of half of that of a lateral wall of the die and the plate-holding face of the punch may be caused to pass close by each other.

The blank may be referred to as plate or raw sheet. The blank may be a steel material, for example. The above-described manufacture method includes the step of heating the blank to 900° C. or higher and soaking and holding the blank for one minute or longer, the step of forming the first ridges, where the starting temperature for forming the first ridges is not lower than 600° C. and not higher than 800° C., and the step of forming the second ridges, where the starting temperature for forming the second ridges is not lower than 300° C. and not higher than 700° C. This enables efficient manufacture of the hat member including the two side walls including the softened portions and strength-transition portions.

In the above-described manufacture method, the punch is moved in a direction toward the die while a plate-shaped blank is located between the punch and die. The die includes a recess. The punch reciprocally moves between the outside and inside of the recess of the die. In this arrangement, the distance between the plate-holding face of the punch and the edges of the recess of the die, i.e. die shoulders, as measured in the direction of stroke of the punch when the punch is at the molding bottom dead center within the recess of the die is treated as the height of a lateral wall of the die. The plate-holding face of the punch is defined as the plane of the punch at its furthest protrusion along the direction of stroke when the punch is at the molding bottom dead center. The plate-holding face of the die is defined as the plane of the die at its furthest protrusion in the direction of stroke when the punch is at the molding bottom dead center.

A method of manufacturing a hat member in another embodiment of the present invention is a method of manufacturing one of the above-described hat members by performing press forming on a blank using a punch and a die. This manufacture method includes: heating the blank to 900° C. or higher and soaking and holding the blank at 900° C. or higher for one minute or longer; forming the first ridges by causing a die shoulder of the die and a plate-holding face of the punch to pass close by each other; and forming the second ridges by causing a position on the die at a height of half that of a lateral wall of the die and the plate-holding face of the punch to pass close by each other.

In the above-described manufacture method, it is desirable that an average relative velocity V2 between the die and the punch after the position on the die at a height of half that of the lateral wall of the die and the plate-holding face of the punch pass close by each other until the plate-holding face of the punch reaches a molding bottom dead center be smaller than one twentieth of a relative velocity V1 between the die and the punch found when the die shoulder and the plate-holding face of the punch pass close by each other.

In such implementations, the velocity of the punch can be reduced in at least part of the distance between the position at a height of half that of the die shoulder and the molding bottom dead center. This will cause differences in hardness between the middle position and the second end of a side wall of the hat member being molded. This will enable efficient manufacture of a hat member having a strength-transition portion and a softened portion.

For example, the molding may occur in such a manner that the velocity V1 for forming the first ridges and the average molding velocity measured between the position at ½ of the height of the hat member relative to the molding bottom dead center and the molding bottom dead center, V2, the satisfy the following relational expression, (1):

$$V2/V1<0.05 \qquad (1).$$

The height of a lateral wall of the die is equivalent to the height of a side wall of the hat member being manufactured. Thus, the position at a height of half that of a lateral wall of the die is equivalent to the middle position of a side wall of the hat member.

A method of manufacturing a hat member in yet another embodiment of the present invention is a method of manufacturing one of the above-described hat members by performing press forming on a blank using a punch and a die. This manufacture method includes: heating the blank to 900° C. or higher and soaking and holding the blank at 900° C. or higher for one minute or longer; forming the first ridges by causing a die shoulder of the die and a plate-holding face (i.e. front face) of the punch to pass close by each other; and forming the second ridges by causing a position on the die at a height of half that of a lateral wall of the die and the plate-holding face of the punch to pass close by each other.

In this manufacture method, an insulator with a thermal conductivity of 0.3 (W/m·K) or may be provided, the insulator being located on a face of the punch positioned to face a plate-holding face of the die or on the plate-holding face of the die. In such implementations, the blank may contact the insulator after the position on the die at a height of half that of the lateral wall of the die and the plate-holding face of the punch pass close by each other by a time at which the plate-holding face of the punch reaches a molding bottom dead center. Further, an average relative velocity V2 between the die and the punch after the position on the die at a height of half that of the lateral wall of the die and the plate-holding face of the punch pass close by each other until the plate-holding face of the punch reaches the molding bottom dead center may be not smaller than one twentieth and not larger than one half of a relative velocity V1 between the die and the punch found when the die shoulder and the plate-holding face of the punch pass close by each other.

In such implementations, an insulator may be in contact with the blank and the velocity of the punch may be lower in at least part of the distance between the position at a height of half that of the die shoulder and the molding bottom dead center. This will cause differences in hardness between the middle position and the other end of a side wall of the hat member being molded. This will enable efficient manufacture of a hat member having a strength-transition portion and softened portion.

For example, in the plate-holding face (i.e. front face) of the die or punch, the contact portions in which the batten is in contact with the blank being press-formed may be made of an insulator with a thermal conductivity of 0.3 (W/m·K) or higher. In such implementations, the molding may occur in such a manner that the molding velocity V1 and the average forming velocity V2 satisfy the following expression, (2):

$$0.05 \leq V2/V1 \leq 0.5 \qquad (2).$$

A method of manufacturing a hat member in still another embodiment of the present invention is a method of manufacturing one of the above-described hat members by performing press forming on a blank using a punch and a die. This manufacture method includes: heating the blank to 900° C. or higher and soaking and holding the blank at 900° C. or higher for one minute or longer; forming the first ridges by causing a die shoulder of the die and a plate-holding face (i.e. front face) of the punch to pass close by each other; and forming the second ridges by causing a position on the die at a height of half that of a lateral wall of the die and the plate-holding face of the punch to pass close by each other.

In this manufacture method, the blank may contact a face of the punch positioned to face a plate-holding face of the die and being at not lower than 300° C. or the plate-holding face of the die being at not lower than 300° C. after the position on the die at a height of half that of the lateral wall of the die and the plate-holding face of the punch pass close by each other by a time at which the plate-holding face of the punch reaches a molding bottom dead center. In such implementations, an average relative velocity V2 between the die and the punch after the position on the die at a height of half that of the lateral wall of the die and the plate-holding face of the punch pass close by each other until the plate-holding face of the punch reaches the molding bottom dead center may be not smaller than one twentieth and not larger than one half of a relative velocity V1 between the die and the punch found when the die shoulder and the plate-holding face of the punch pass close by each other.

In such implementations, a plate-holding face, being at not lower than 300° C., may be in contact with the blank and the velocity of the punch may be lower in at least part of the distance between the position at a height of half that of the die shoulder and the molding bottom dead center. This will cause differences in hardness between the middle position and the second end of a side wall of the hat member being molded. This will enable efficient manufacture of a hat member having a strength-transition portion and softened portion.

For example, in the plate-holding face of the punch or die, the contact portions where the punch or die is in contact with the blank being press-formed may be heated to 300° C. or higher. In such implementations, the molding may occur in such a manner that the molding velocity V1 and the average molding velocity V2 satisfy the above-provided Expression (2).

Embodiments

Figure 1B:
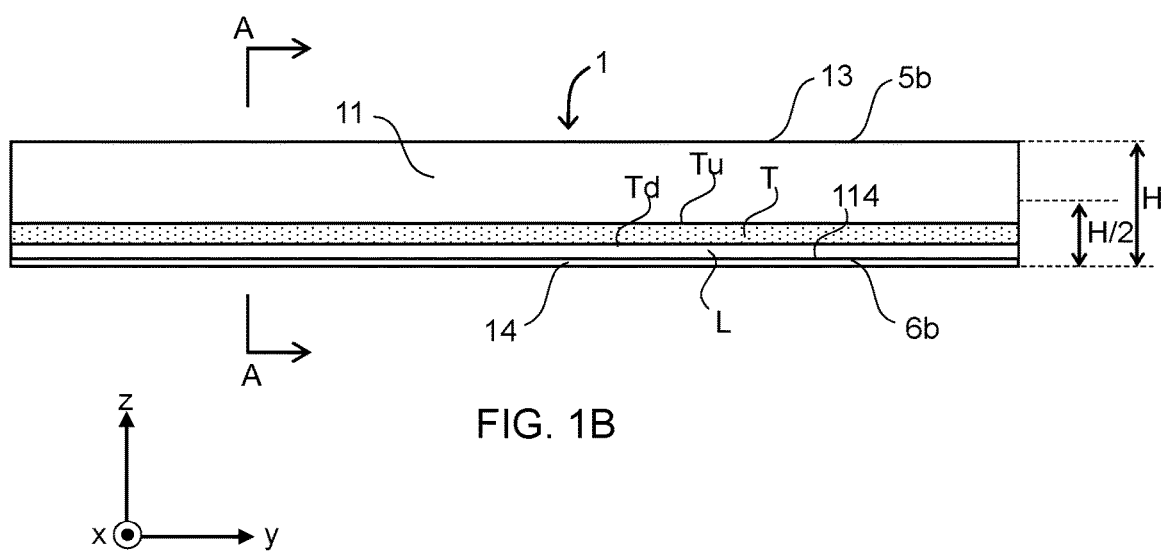
FIG. 1B is a side view of the hat member 1 of FIG. 1A as viewed in the x-direction.

FIG. 1A is a cross-sectional view of a hat member according to an embodiment perpendicular to the longitudinal direction of the hat member. FIG. 1B is a side view of the hat member 1 of FIG. 1A as viewed in the direction that is perpendicular to the longitudinal direction of the hat member and parallel to the top-plate portion (i.e. x-direction). FIG. 1A shows a cross section of the hat member 1 taken along line A-A of FIG. 1B.

The hat member 1 includes a top-plate portion 13, two first ridges 113 on the two ends of the top-plate portion 13, two side walls 11 extending from the respective first ridges 113, two second ridges 114 on those ends of the respective side walls 11 which are opposite to those adjacent to the top-plate portion 13, and two flanges extending from the respective second ridges 114 away from each other.

The top-plate portion 13 and each side wall 11 form an angle θ of 90°≤θ≤135°. The first end of each side wall 11 is adjacent to the associated one of the first ridges 113. The second end of the each side wall 11 is adjacent to the second ridge 114. The first and second ridges 113 and 114 extend in the longitudinal direction of the hat member 1. In the implementation shown in FIG. 1, the first and second ridges 113 and 114 are parallel to each other; alternatively, they may not be parallel to each other.

A curved (round) portion 5 is formed on the border between each of the two side walls 11 and the top-plate portion 13. That is, that end portion of each side wall 11 which includes the wall's first end is curved and round. As such, the surface of the shoulder of the hat member between the side wall 11 and the top-plate portion 13 is a curved surface. The height of the side wall 11 as measured in the direction perpendicular to the top-plate portion 13, H, is determined assuming that that curved (round) portion 5 is part of the side wall 11. That is, that border of the curved (round) portion 5 which is adjacent to the top-plate portion 13 (i.e. end of the round portion), 5b, is treated as the first end of the side wall 11. The first ridge 113 is adjacent to the first end of the side wall 11, i.e. round-portion border 5b.

A curved (round) portion 6 is formed on the border between each of the two side walls 11 and the associated one of the two flanges 14. That is, that end portion of each side wall 11 which includes the wall's second end is curved and round. As such, the surface of the shoulder of the hat member between the side wall 11 and the flange 14 is a curved surface. The height of the side wall 11 as measured in the direction perpendicular to the top-plate portion 13, H, is determined assuming that that curved (round) portion 6 is part of the side wall 11. That is, that border of the curved (round) portion 6 which is adjacent to the flange 14 (i.e. end of the round portion), 6b, is treated as the second end of the side wall 11. The second ridge 114 is adjacent to the second end of the side wall 11.

The middle hardness Dc, defined as the lower one of the hardnesses of the two side walls 11 at their middle positions 11c as determined along the direction perpendicular to the top-plate portion 13 (i.e. z-direction), is not lower than 300 HV. That is, the hardness of the two side walls 11 at their middle positions 11c is not lower than 300 HV.

Each of the two side walls 11 includes a softened portion L and a strength-transition portion T. The softened portion L extends from the second end of the side wall 11 (i.e. round-portion border 6b) to a position before the middle position 11c. In the implementation shown in FIG. 1A, the softened portion L provide the curved portion 6 and part of the flange 14. The hardness Dn of the softened portion L is lower than the middle hardness Dc by at least 8% (Dc−Dn≥0.08Dc).

The strength-transition portion T is adjacent to the softened portion L. The strength-transition portion T extends from the softened portion L to a position 0.5 mm or more away therefrom toward the first end of the side wall 11 (i.e. round-portion border 5b) and is located closer to the second end (6b) than the middle position 11c between the first end (5b) and second end (6b) of the side wall 11. Specifically, the width Lt, as measured between that end of the strength-transition portion T which is closer to the first ridge 113, Tu, and that end which is closer to the second ridge 114, Td, is not smaller than 0.5 mm. Both the end Tu of the strength-transition portion closer to the first ridge 113 and the end Td closer to the second ridge 114 are located between the middle position 11c and second end 6b of the side wall.

The hardness of the strength-transition portion T is in the range of 8% to 1% lower than the middle hardness. That is, the hardness of the strength-transition portion T transitionally changes between the level lower than the middle hardness by 8% to the level lower than the middle hardness by 1%.

Providing the softened portion L and strength-transition portion T improves the maximum tolerable load upon application of a load in a direction generally perpendicular to the top-plate portion 13 (i.e. z-direction) over implementations without a softened portion or a strength-transition portion. In the implementation shown in FIG. 1B, the width of the strength-transition portion T as measured in the direction perpendicular to the top-plate portion 13 (i.e. z-direction) is constant as it goes along the longitudinal direction of the hat member (i.e. y-direction). Alternatively, the width of the strength-transition portion T as measured in the direction perpendicular to the top-plate portion 13 (i.e. z-direction) may vary as it goes along the longitudinal direction of the hat member (i.e. y-direction). In such implementations, the width Lt between the end Tu and end Td of the strength-transition portion T is defined as the average value for the section of the hat member 1 associated with the strength-transition portion extending in the longitudinal direction (i.e. y-direction).

Further, in the implementation shown in FIG. 1B, each strength-transition portion T extends the entire length of the hat member 1 (in the y-direction); alternatively, the strength-transition portion T may extend part of the length of the hat member. In such implementations, it is preferable that the dimension of the strength-transition portion T as measured in the longitudinal direction be not smaller than the height H of the side wall, for example. This will increase the presence of the effect of improving the maximum load.

Although the positioning of the strength-transition portions T as determined along the longitudinal direction of the hat member 1 is not limited to a particular range, some exemplary positionings will be discussed below. It is preferable that the strength-transition portions T are positioned to cover the middle of the hat member 1 as determined along their longitudinal direction. Thus, the strength-transition portions T may be at positions where local deformation is expected upon application of an impact in a direction generally perpendicular to the top-plate portion. Further, the hat member 1 may be supported on another member at two support portions that are separated in the longitudinal direction. The strength-transition portions T are preferably positioned to cover the longitudinal middle between the two support portions of the hat member 1. Thus, the strength-transition portions T are at positions where local deformation is expected upon application of an impact in a direction generally perpendicular to the top-plate portion.

Further, the hat member 1 may be curved along the longitudinal direction to protrude away from the top-plate portion 13. In such implementations, the strength-transition portion T in each side wall 11 is preferably at a position where the top-plate portion 13 is at its highest when the hat member 1 is placed on a horizontal surface such that the top-plate portion 13 faces upward. Thus, the strength-transition portions T are at positions where local deformation is expected upon application of an impact to the top-plate portion in a direction generally perpendicular to the top-plate portion. Alternatively, a closing plate may be joined to the pair of flanges 14 of the hat member 1. In such arrangements, the hat member 1 may be curved along the longitudinal direction to protrude away from the closing plate 2. In such implementations, the strength-transition portion T in each side wall 11 is preferably at positions where the closing plate is at its highest when the hat member 1 is placed on a horizontal surface such that the closing plate faces upward. Thus, the strength-transition portions T are at positions where local deformation is expected upon application of an impact to the closing plate in a direction generally perpendicular to the closing plate.

For example, when the hat member 1 is used as a bumper reinforcement or center pillar (B-pillar), the strength-transition portions T may be positioned to cover the middle of the bumper reinforcement or center pillar as determined along the longitudinal direction.

The softened portion L may extend the entire length of the hat member 1 (in the y-direction) or may extend part of the length of the hat member. For example, the dimension of the softened portion L as measured in the longitudinal direction is preferably not smaller than the height H of the side walls. This will increase the presence of the effect of improving the maximum load.

The positioning of the softened portions L of the hat member 1 as determined along the longitudinal direction is not limited to a particular range. For example, the softened portions L may be positioned to overlap the strength-transition portions T as determined along the longitudinal direction of the hat member 1.

Figure 2:
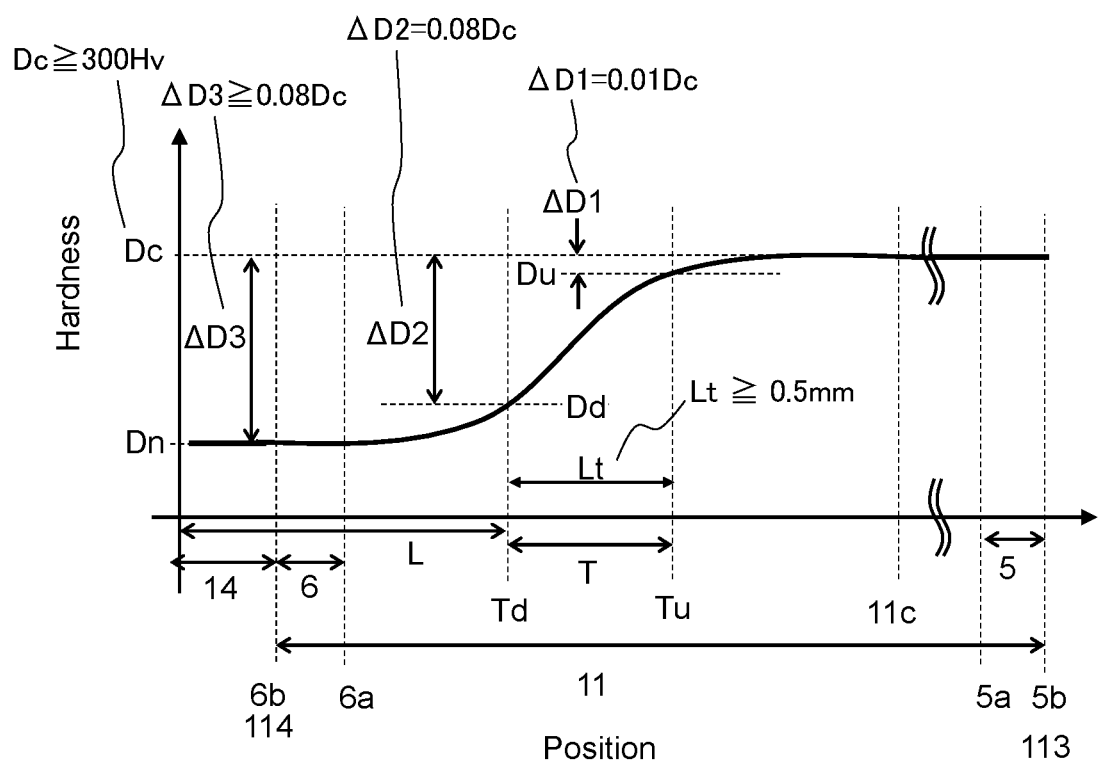
FIG. 2 is a graph showing an exemplary strength distribution for a side wall.

FIG. 2 is a graph showing an exemplary strength distribution for a side wall 11. In the implementation shown in FIG. 2, the middle hardness Dc, which is the hardness of the side wall 11 as measured at the middle position 11c, is not lower than 300 HV (Dc≥300HV). The difference between the hardness Dn of the softened portion L and the middle hardness Dc of the side wall 11, ΔD3, is not smaller than 0.08Dc (ΔD3=Dc−Dn≥0.08Dc). That is, the maximum hardness of the softened portion L is 0.92Dc. In the implementation shown in FIG. 2, part of the flange 14 and the curved portion 6 are included in the softened portion L. Some portions of the softened portion L may have hardnesses higher than 0.92Dc as long as they do not affect the material properties.

Between the second ridge 114 and the middle position 11c of the side wall 11, the hardness of the side wall 11 rises as it goes away from the second ridge 114 toward the middle position 11c.

The strength-transition portion T is located between the softened portion L and the middle position 11c of the side wall 11. The hardness Dt of the strength-transition portion T transitionally changes from Dd to Du as it goes away from the softened portion L toward the middle position 11c. That is, the hardness Dt of the strength-transition portion T transitionally changes in the range Dd≤Dt≤Du. The hardness Dd is lower than the middle hardness Dc by 0.08Dc. That is, the difference between the lowest hardness Dd and middle hardness Dc of the strength-transition portion T, ΔD2, is 0.08Dc (ΔD2=Dc−Dd=0.08Dc). The highest hardness Du of the strength-transition portion T is lower than the middle hardness Dc by 5 HV. That is, the difference between the hardness Du and middle hardness Dc, ΔD1, is 0.01Dc (ΔD1=Dc−Du=0.01Dc)

In the implementation shown in FIG. 2, the position on the side wall 11 with a hardness 8% lower than the middle hardness Dc represents the border between the softened portion L and strength-transition portion T, i.e. end Td of the strength-transition portion T closer to the second ridge 114. Further, the position on the side wall 11 with a hardness 1% lower than the middle hardness Dc represents the border between the strength-transition portion T and the region covering the middle position 11c (i.e. non-softened portion), i.e. end Tu of the strength-transition portion T closer to the first ridge 113.

In the implementation shown in FIG. 2, the hardness of the strength-transition portion T rises as it goes closer to the middle position 11c. That is, the hardness of the strength-transition portion T increases monotonically as it goes from the softened portion L toward the middle position 11c. Regarding the transitional change in the hardness of the strength-transition portion T, it is only required that the strength-transition portion T as a whole have a hardness with a tendency to increase monotonically. In some portions of the strength-transition portion T, the hardness may decrease as it goes toward the middle position 11c, or some portions of the strength-transition portion may have no changes in hardness depending on position, that is, may be portions with a constant hardness.

The width Lt of the side wall 11, as measured between that end Td of the strength-transition portion T which is closer to the second ridge 114 and the end Tu closer to the first ridge 113, is not smaller than 0.5 mm (Lt≥0.5 mm). This prevents strains upon application of a load in a direction generally perpendicular to the top-plate portion 13 from being concentrated excessively in the strength-transition portion T. Further, the width Lt is preferably not larger than five times the average thickness t of the strength-transition portion T (Lt≤5t), for example. This makes it possible to obtain the desired deformation mode by concentrating, in the strength-transition portion, deformation due to application of a load in a direction generally perpendicular to the top-plate portion 13. The width Lt is defined as the distance between the ends Tu and Td of the strength-transition portion T on a line obtained by projecting a line in a direction perpendicular to the top-plate portion 13 onto the surface of the side wall 11.

The rate of change in the hardness of the strength-transition portion (Du−Dd)/Lt is preferably 3 to 100 HV/mm (3 [HV/mm]≤(Du−Dd)/Lt≤100 [HV/mm]), for example. This is because a rate of change in hardness above 100 HV/mm may lead to concentration of strain in the strength-transition portion such that a break can easily occur, while a rate of change in hardness below 3 HV/mm may result in insufficient deformation of the strength-transition portion.

In the implementation shown in FIG. 2, the portions between the middle position 11c of the side wall 11 and the first ridge 113 are high-strength portions with hardnesses not lower than 300 HV. Alternatively, a second softened portion with hardnesses lower than the middle hardness by 8% or more may be provided between the first ridge 113 and a position before the middle position 11c as determined away from the first ridge toward the middle position 11c of the side wall 11.

The flanges 14 are not limited to a particular strength or a particular strength distribution. This is because the strength of the flanges 14 does not significantly affect the performance of the hat member 1.

Figure 3:
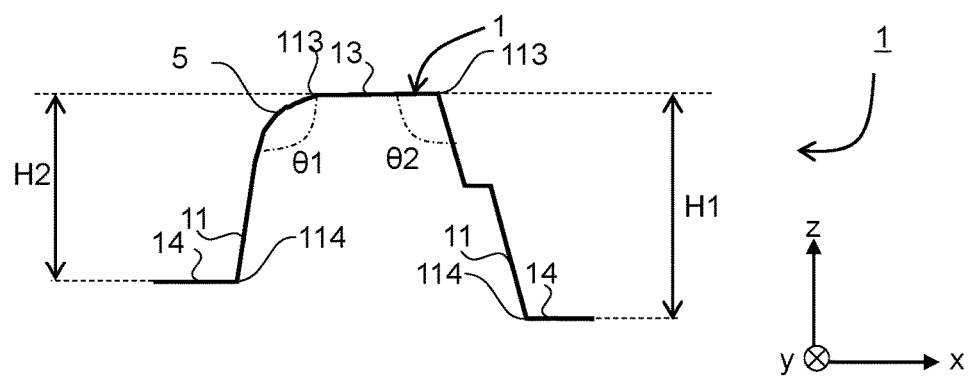
FIG. 3 is a cross-sectional view of a variation of the hat member with a different cross-sectional shape.

FIG. 3 is a cross-sectional view of a variation of the above-discussed hat member 1 with a different cross-sectional shape. The hat member 1 shown in FIG. 3 includes two side walls 11 with different shapes. For the two side walls 11, the angles θ1 and θ2 relative to the top-plate portion 13 are different from each other, and the heights HR and HL are different from each other. Thus, the two flanges 14 are at different positions as determined along the height direction. If the hat member 1 has an asymmetrical cross section, the heights H1 and H2 of the two side walls 11 are defined separately.

In the implementation shown in FIG. 3 having the two side walls 11 and 12, the one side walls 11 has a stepped portion. Even in implementations where the side wall 11 has a stepped portion, the height H1 of the side wall 11 is defined as the distance between the side wall's first end contiguous to the first ridge 113 and the second end contiguous to the second ridge 114 as measured in the height direction. That is, the height H1 of the side wall 11 is defined as the distance between the lowermost position and the uppermost position of the side wall 11 as determined along the height direction. The same applies to implementations where the side wall 11 has recesses/protrusions or holes. Height direction is defined as the direction perpendicular to the top-plate portion 13.

Although not shown, the surface of at least one of the top-plate portion 13, side walls 11 and flanges 14 may be a curved surface, rather than a flat surface. That is, at least one of the top-plate portion 13, side walls 11 and flanges 14 may be curved.

Figure 4:
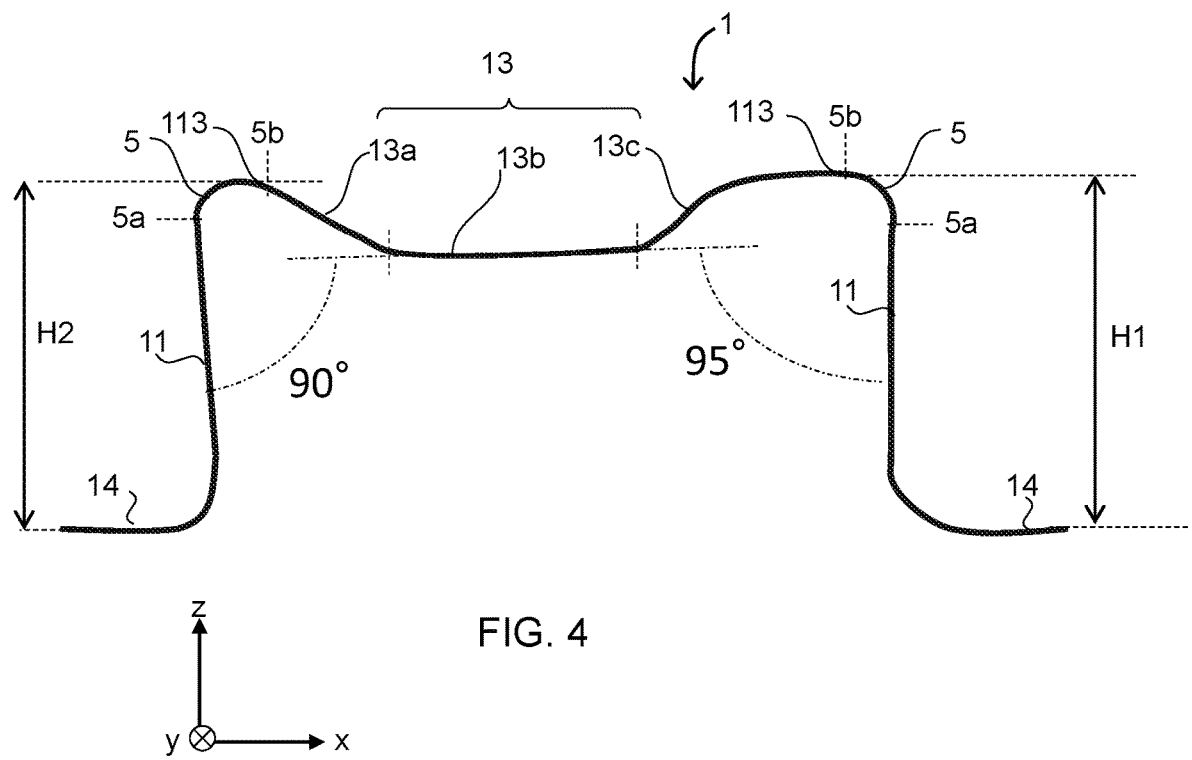
FIG. 4 is a cross-sectional view of another variation of the hat member with a different cross-sectional shape.

FIG. 4 is a cross-sectional view of a variation of the above-discussed hat member 1 with a different cross-sectional shape. The hat member 1 shown in FIG. 4 includes a top-plate portion 13 having inclined portions 13a and 13c adjacent to its two ends and a central portion 13b between the inclined portions 13a and 13c. The inclined portions 13a and 13c are contiguous to the respective first ridges 113 and include inclined surfaces. The inclined surfaces of the inclined portions 13a and 13c are inclined downward as it goes inwardly with respect to the top-plate portion 13. That is, the top-plate portion 13 has a recess. In such implementations, the heights H1 and H2 of the side walls 11 are determined assuming that the direction perpendicular to the central portion 13b of the top-plate portion 13 represents the direction perpendicular to the top-plate portion 13. Further, the angle between the plane of the central portion 13b of the top-plate portion 13 and a side wall 11 is treated as the angle formed by the top-plate portion 13 and side wall 11. In the implementation shown in FIG. 4, the curved portion 5 between the top-plate portion 13 and each side wall 11 slightly expands outwardly.

In the implementations shown in FIGS. 1A and 1B, the hat member 1 extends in the longitudinal direction in the shape of a straight line. Alternatively, the hat member 1 may be curved. For example, the hat member 1 may be curved to protrude from the top-plate portion 13. That is, the hat member 10 may be curved such that the outer surface of the top-plate portion 13 protrudes.

Figure 5A:
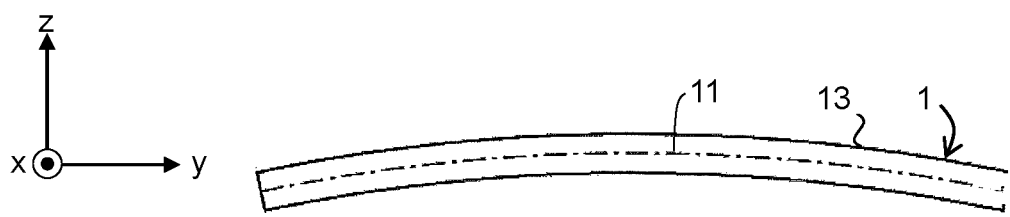
FIG. 5A is a side view of a curved structural member.
Figure 5B:
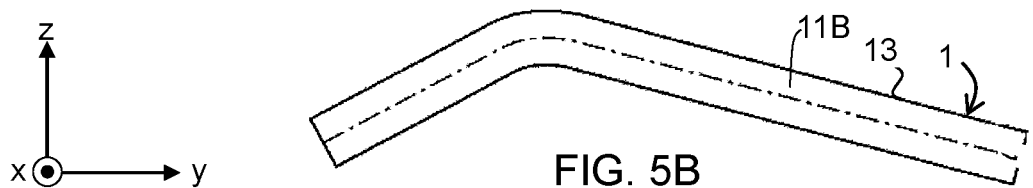
FIG. 5B is a side view of a curved structural member.
Figure 5C:
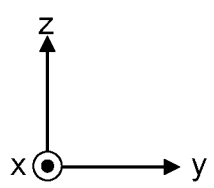
FIG. 5C is a side view of a curved structural member.
Figure 5C:
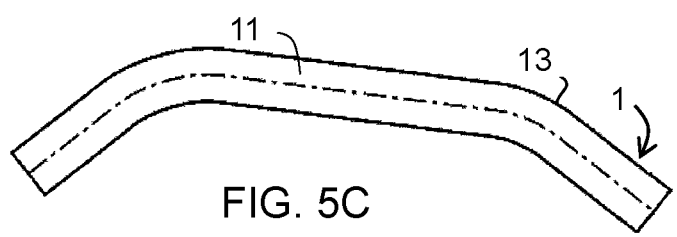
Figure 5D:
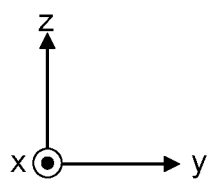
FIG. 5D is a side view of a curved structural member.
Figure 5D:
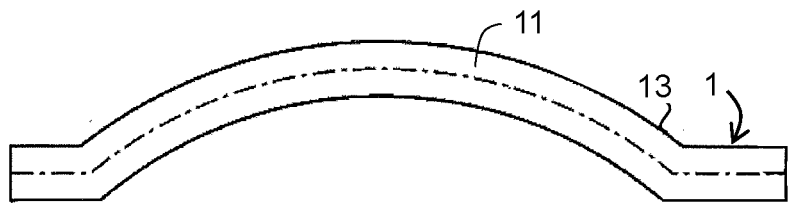

FIGS. 5A to 5D are side views of examples of the hat member 1 that are curved along the longitudinal direction. In each of the implementations shown in FIGS. 5A to 5D, the hat member 1 is curved to protrude from the top-plate portion 13. In FIG. 5A, the hat member 1 is curved with a curvature that is constant along the entire length. In each of FIGS. 5B and 5C, the curvature varies depending on the position on the hat member 1 as determined along the longitudinal direction of the closed-cross-section structure (i.e. direction of extension of the first ridges). In FIG. 5D, some portions of the hat member 1 as determined along the longitudinal direction are curved. In each of the implementations shown in FIGS. 5A and 5D, the hat member 1 is curved in left-right symmetry as viewed in the direction perpendicular to the side walls 11 (i.e. x-direction). The hat member 1 of each of FIGS. 5B, 5C and 5D includes portions that are curved (i.e. curved portions) and portions extending as straight lines (i.e. straight-line portions). In the implementation shown in FIG. 5C, curved portions are positioned on both sides of a straight-line portion as determined along the longitudinal direction. That is, a straight-line portion is positioned between curved portions. In the implementation shown in FIG. 5D, straight-line portions are positioned on both sides of a curved portion as determined along the longitudinal direction.

Such a curved hat member 1 will improve the impact resistance against an impact in a direction generally opposite to the direction of protrusion of the curve. For example, a structural member formed by joining a closing plate to a curved hat member 1 and have this structure's both ends supported by another member has a high impact resistance against an impact in a direction generally opposite to the direction of protrusion of the curve. Alternatively, the hat member 1 may be curved such that the top-plate portion 13 is recessed.

[Applications in Vehicles]

A structural member formed by joining a closing plate to the flanges 14 of the hat member 1 may be used as a structural member for a vehicle, for example. In such implementations, the structural member may be mounted on the vehicle where the member is supported thereon at two connections that are separated in the longitudinal direction of the member. The structural member including the hat member 1 may be used, for example, as a structural member for a vehicle body, bumper or vehicle door. As such, a vehicle body, bumper or vehicle door including a structural member including the hat member 1 are encompassed by the embodiments of the present invention.

If a structural member including the hat member 1 is mounted on a vehicle, the structural member is often positioned such that the longitudinal profile of the structural member extends along the outer shape of the vehicle. That is, the structural member is often mounted on the vehicle such that an impact derived from a crash of the vehicle is in a direction generally perpendicular to the longitudinal direction of the structural member. Further, the structural member may be mounted on the vehicle such that the top-plate portion 13 is positioned outward with respect to the vehicle and the closing plate is positioned inward with respect to the vehicle. As such, when the structural member receives an impact from outside the vehicle, the structural member protrudes inwardly with respect to the vehicle to a smaller extent. Conversely, the closing plate may be positioned outward with respect to the vehicle. In implementations where the closing plate is positioned outward with respect to the vehicle, too, when the structural member receives an impact from outside the vehicle, the structural member protrudes inwardly with respect to the vehicle to a smaller extent.

The structural member including the hat member 1 may be curved, as discussed above. In such implementations, the structural member is mounted on the vehicle to protrude outwardly with respect to the vehicle. Thus, when the structural member receives an impact from outside the vehicle, the member is less likely to be bent sharply.

The structural member including the hat member 1 may serve as a structural member constituting part of a vehicle body, a bumper or a vehicle door. For example, a structural member including the hat member 1 may be used in a member constituting part of the vehicle body, such as an A-pillar, a B-pillar, a side sill, a locker, a roof rail, a floor member, and a front side member. Alternatively, a structural member including the hat member 1 may be used as a member to be mounted on the vehicle body, such as a door impact beam or a bumper reinforcement, to protect a device or a passenger inside the vehicle from impacts from outside.

Figure 6:
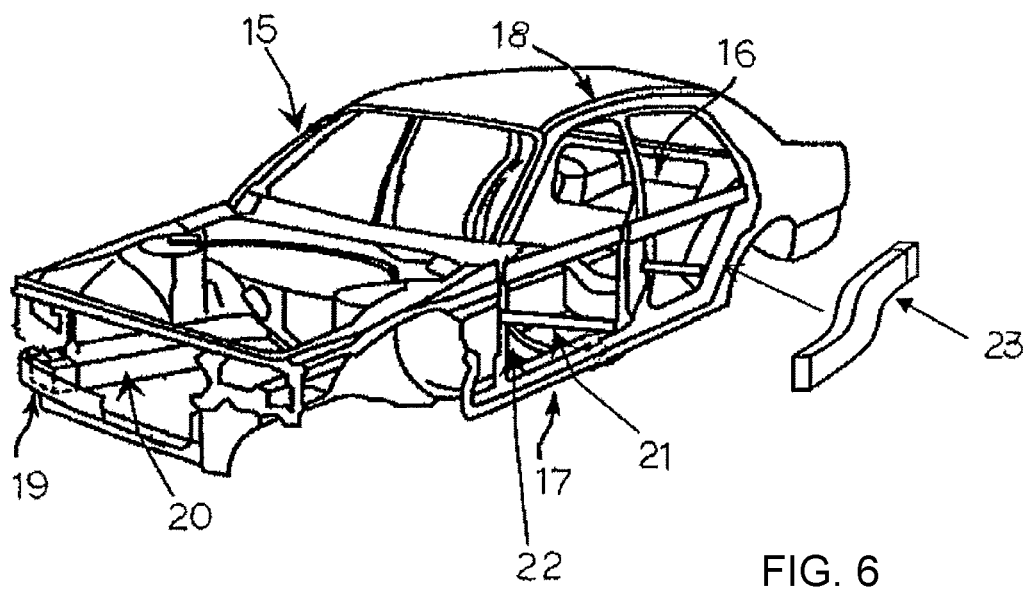
FIG. 6 shows exemplary structural members positioned on a vehicle.

FIG. 6 shows exemplary structural members being mounted on a vehicle that uses a monocoque structure. In the implementation shown in FIG. 6, an A-pillar 15, a B-pillar 16, a locker 17, a roof rail 18, a bumper reinforcement 19, a floor side member 20, a door impact beam 21, a floor member 22 and a rear side member 23 are used as vehicle structural members. At least one of these vehicle structural members may be constituted by a structural member including the hat member discussed above.

[Manufacture Process]

The entire hat member 1 may be formed from one and the same material. The hat member 1 may be formed, for example, from a steel plate. The process for manufacturing the hat member 10 includes the step of fabricating a hat member 1 having softened portions L and strength-transition portions T. The step of fabricating the hat member 1 includes the sub-step of creating differences in strength in the material to form low-strength regions. The manufacturing process may further include the step of causing the hat member 1 to curve. The hat member 1 is caused to curve by a bending method, such as press bending, stretch bending, compression bending, roll bending, MOS bending or eccentric-plug bending, for example.

The process for manufacturing the hat member 1 includes the step of forming softened portions and strength-transition portions in the material. The forming of the softened portions and strength-transition portions is not limited to a particular method; for example, a steel plate may be deformed by roll forming to have a hat-shaped cross section, and the material may be locally heated and quenched using a laser or by high-frequency heating, for example, to produce a hat member 1 including hardened regions. In such cases, the regions that have not been quenched constitute softened portions and strength-transition portions with relatively low strengths. Alternatively, the entire hat member 1 may be strengthened by thermal refining, and local annealing may then be performed to form softened portions and strength-transition portions.

Alternatively, the hat member 1 may be fabricated by hot pressing (hot stamping). During hot pressing, heating or cooling conditions may be varied locally within one and the same material to form softened regions and strength-transition regions in the material. For example, a steel plate may be heated to a temperature that causes steel to form a single-phase austenitic region (i.e. Ac3 temperature) or higher, and quenched while being shaped using a mold. Differences in the cooling rate are created during this step such that the rapidly cooled portions provide a generally hard martensitic microstructure and the slowly cooled portions provide a soft mixed-phase microstructure with ferrite and pearlite or a bainitic microstructure. Thus, the slowly cooled portions provide softened regions and strength-transition regions. Alternatively, the entire member may be hot-pressed to become a high-strength portion of a martensitic microstructure, and local quenching may then be performed to form softened portions and strength-transition portions.

For example, the step of manufacturing the hat member may include the sub-steps of molding a steel plate, quenching the molded steel plate, and partially tempering the quenched steel plate to become hat-shaped.

The sub-step of molding involves, for example, performing press forming on a steel pipe while performing at least one round of heat treatment at a temperature not lower than the Ac3 point to create a hat shape with a top-plate portion, two first ridges on the two ends of the top-plate portion, two side walls each extending from first end adjacent to the associated first ridge to the second end and angled at 90 to 135° relative to the top-plate portion, two second ridges adjacent to the second ends of the respective side walls, and two flanges extending away from each other from the respective second ridges.

The sub-step of quenching involves quenching a steel plate that has been molded to have a middle hardness not lower than 300 HV, the middle hardness being defined as the lower one of the hardnesses of the two side walls at their middle positions as determined along the direction perpendicular to the top-plate portion.

The sub-step of tempering involves heating, at least once and to 200° C. or higher, a softened portion of each of the two side walls of the quenched hat-shaped steel plate, the softened portion extending from the second end to a position before the middle position, and a strength-transition portion that is adjacent to the softened portion, the strength-transition portion extending from the softened portion to a position 0.5 mm or more away from the softened portion toward the first end and located closer to the second end than the middle position between the first end and the second end, such that the hardness of the softened portion is at least 8% lower than the middle hardness and that the hardness of the strength-transition portion is 8 to 1% lower than the middle hardness.

The manufacturing of the hat member 1 is not limited to the above-discussed exemplary method. For example, a tailored blank may be used to form the hat member 1. Alternatively, it is possible to obtain the hat member 1 by preparing a hat-shaped molded product made from a high-strength steel plate with a tensile strength not lower than 980 MPa (more preferably, not lower than 1180 MPa) and tempering the section of the molded product extending from the second end to the middle position of each side wall using a laser from a large condensing aperture. Other known methods may be used to form a hat member 1 having softened portions and strength-transition portions.

EXAMPLES

[Simulations]

Figure 7:
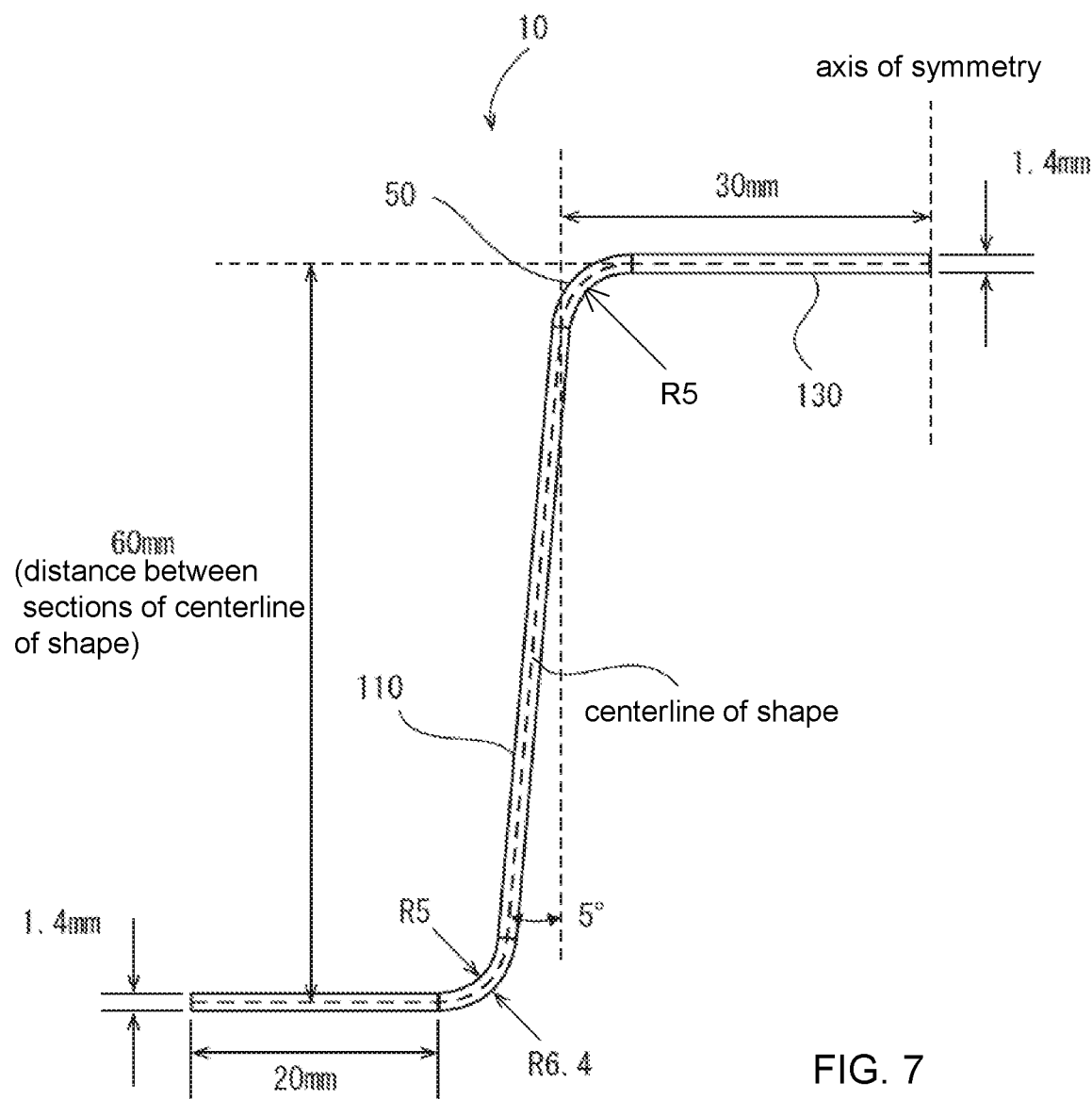
FIG. 7 shows the construction of an analysis model for simulations.

The present examples used simulations to analyze deformation of a structural member when an impacter hit its hat member. FIG. 7 shows the construction of an analysis model used for the simulations. The present simulations analyzed the deformation behavior of a hat member 10 including a top-plate portion 130, side walls 110 and flanges 140 upon application of a compressive force in the direction perpendicular to the top-plate portion 130. The dimensions and shape of the hat member 10 of the analysis model was as shown in FIG. 7.

Figure 8:
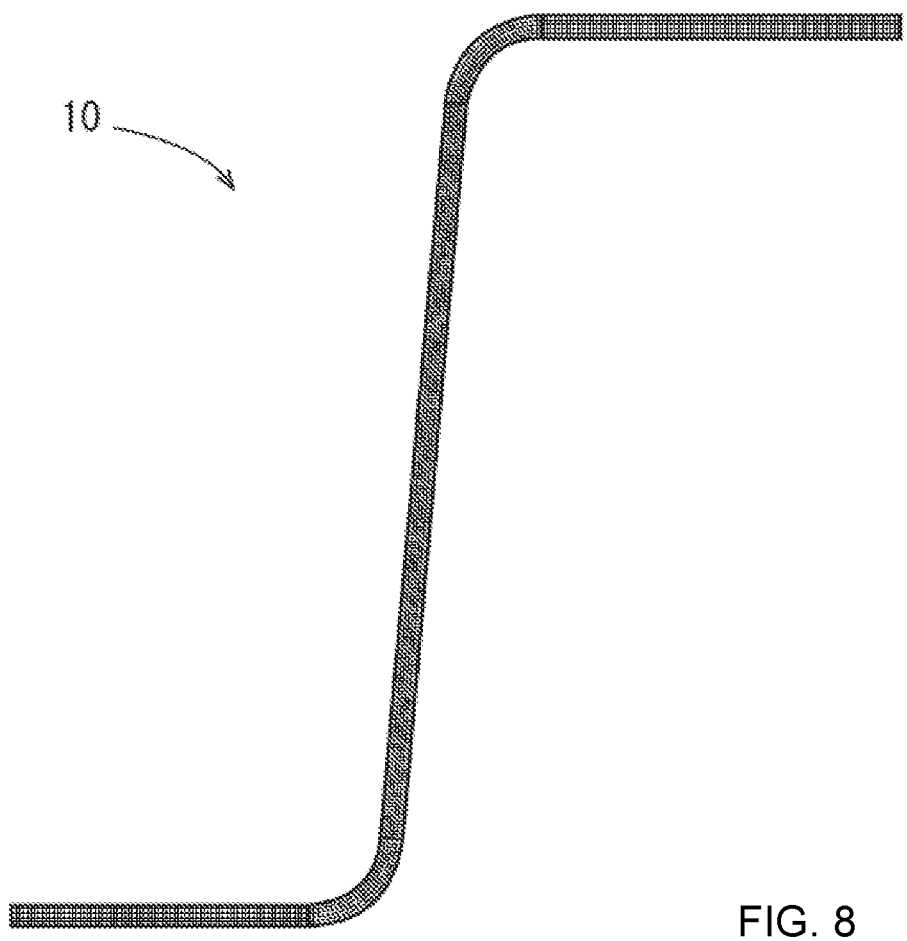
FIG. 8 shows the mesh of the hat member of the analysis model of FIG. 7.
Figure 9:
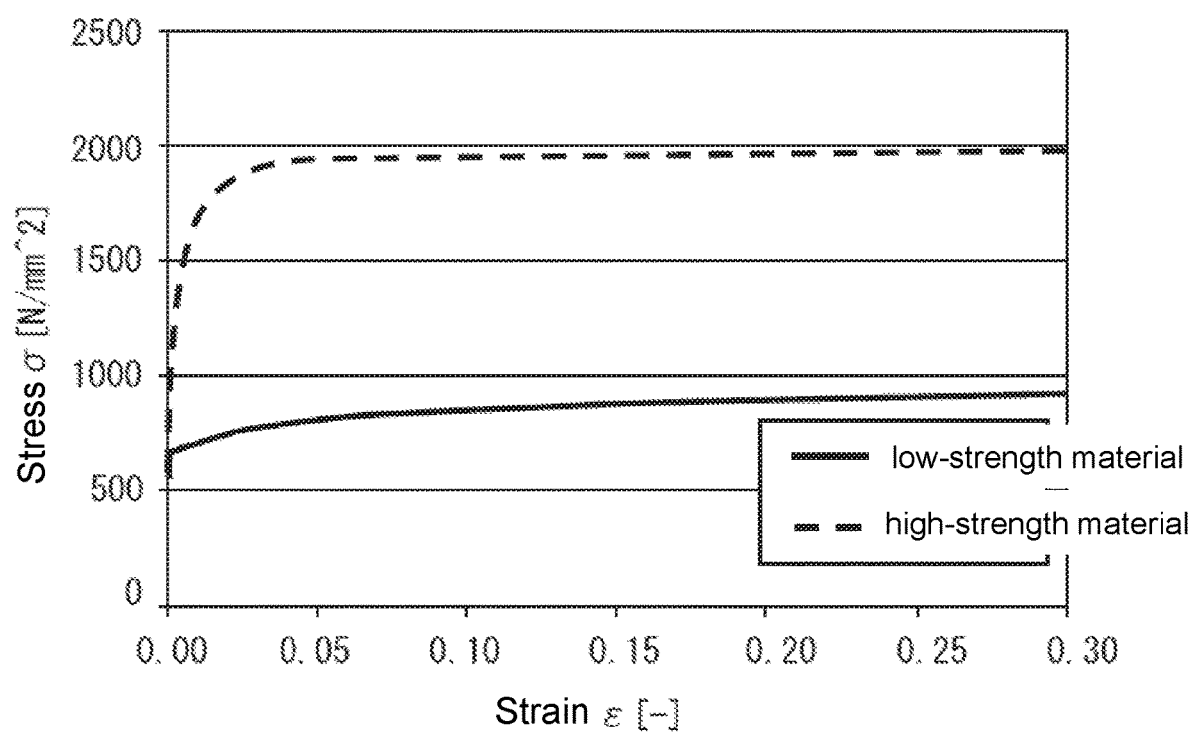
FIG. 9 is a graph with SS curves of the material of the hat member of the analysis model.

FIG. 8 shows the meshing of the hat member 10 of the analysis model shown in FIG. 7. The meshing shown in FIG. 8 was constructed from five overlying meshes, each with a mesh size of 0.28 mm. The element type was plane-strain element (CPE 8 [eight nodes, secondary element]). The number of nodes was 6607 and the number of elements was 1940. The Young's modulus of the material of the hat member 10 was 2.0594E+5 [N/mm^2], and the Poisson's ratio of the material was 0.3 [-]. The material had the same S-S curves as shown in FIG. 9. The properties of the low-strength material in the graph of FIG. 9 were used as those of the softened portion, and the properties of the high-strength material in the graph of FIG. 9 were used as those of the high-strength portion. For the strength-transition portion, a plurality of S-S curves obtained by gradually varying the properties from those of the high-strength material in the graph of FIG. 9 to those of the low-strength material in the graph of FIG. 9 to represent slow changes in material properties in the strength-transition portion.

Figure 10:
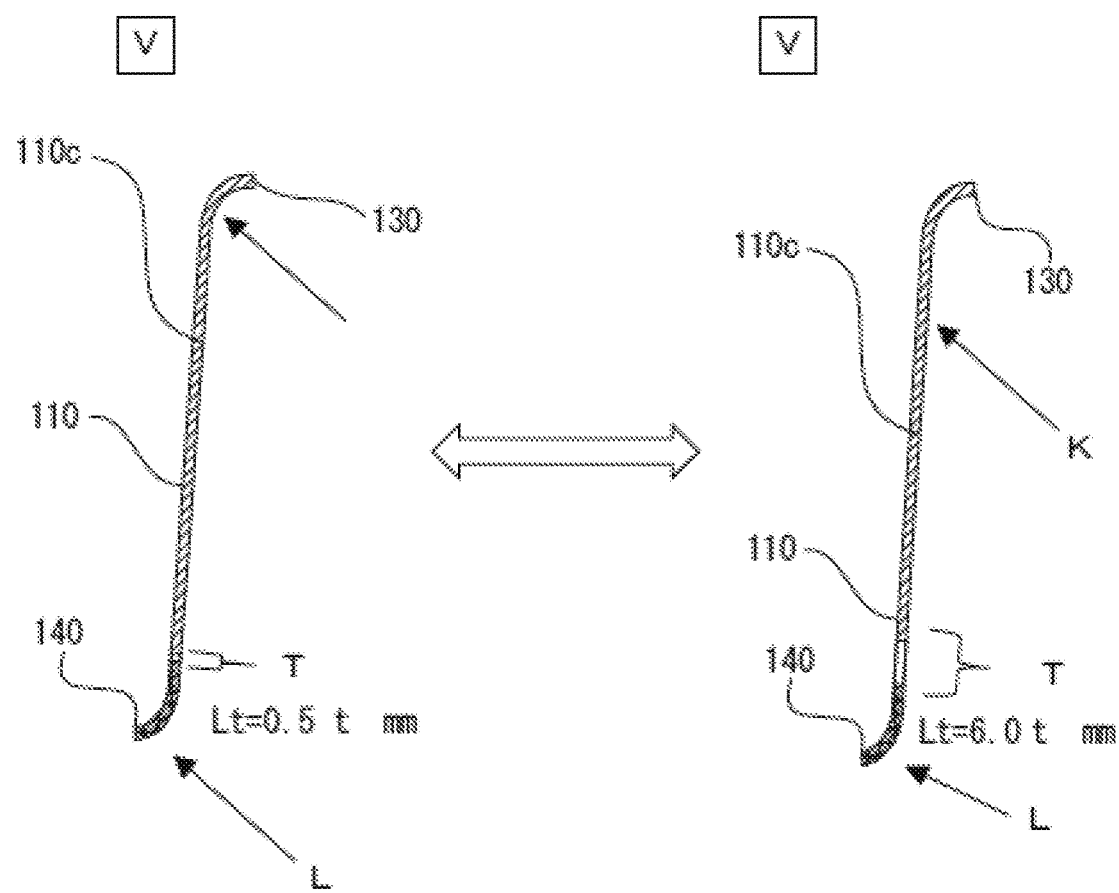
FIG. 10 illustrates strength distributions set for the simulations.
Figure 10:
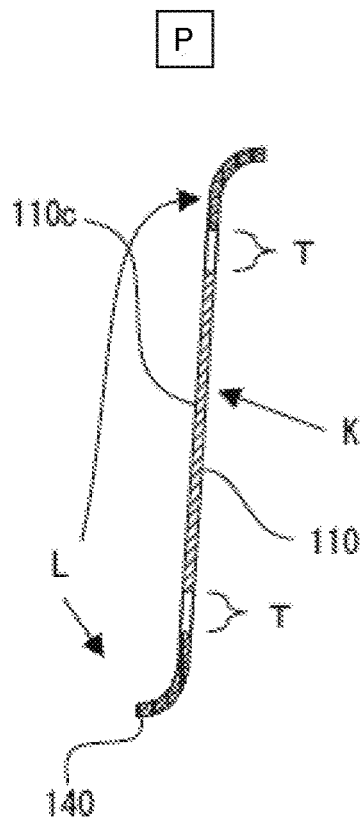

The analysis model of FIGS. 7 and 8 was used to conduct simulations with different strength distributions in the side walls 110. FIG. 10 illustrates the strength distributions set in the simulations. The simulations were conducted using two strength distribution types, V and P, shown in FIG. 10. In strength distribution type V, a softened portion L and a strength-transition portion T were present between the middle position 110c of each side wall 110 and the wall's end adjacent to the associated flange 140, the portions between the strength-transition portion T and top-plate portion 130 representing a high-strength portion. In strength distribution type P, a softened portion L and a strength-transition portion T were present between the middle position 110c of each side wall 110 and the associated flange 140, while another softened portion L and another strength-transition portion T were present between the top-plate portion 130 and middle position 110c. Each of two strength distribution types V and P was analyzed while the width of the strength-transition portion(s) T was varied. Specifically, the width of the strength-transition portion(s) T was varied stepwise between 0.5 times to 6.0 times the average thickness of the strength-transition portion(s) T, and analysis was conducted for each step.

In addition to the strength types shown in FIG. 10, analysis was conducted on a strength distribution type N with a homogeneous strength distribution with the entire hat member 10 having high strength, a strength distribution type A with a homogeneous strength distribution with the entire hat member 10 softened, and a strength distribution type F with only the flanges 140 softened.

Figure 11:
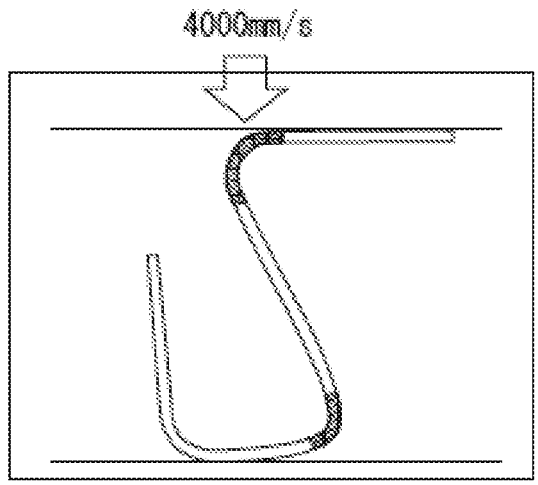
FIG. 11 shows how the hat member of each simulation deforms when crushed.
Figure 11:
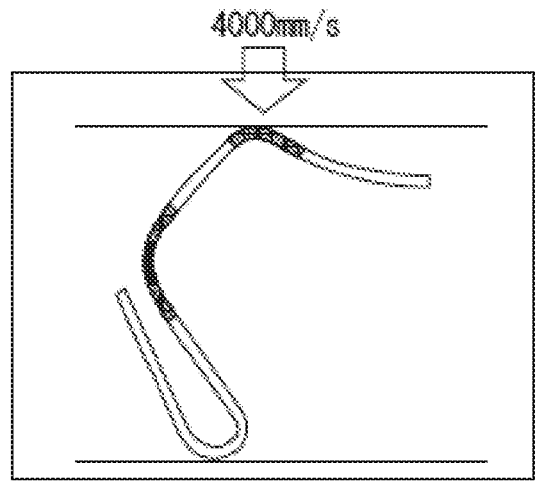
Figure 11:
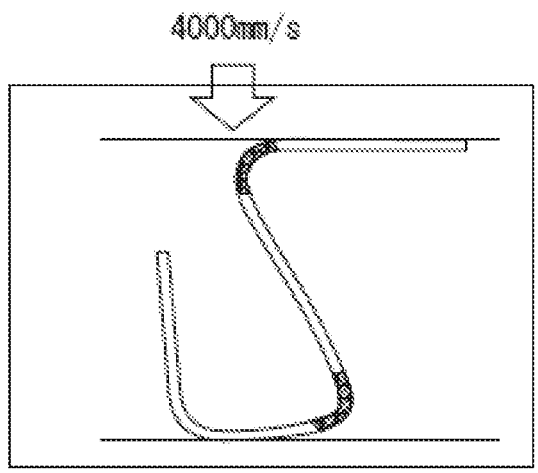
Figure 11:
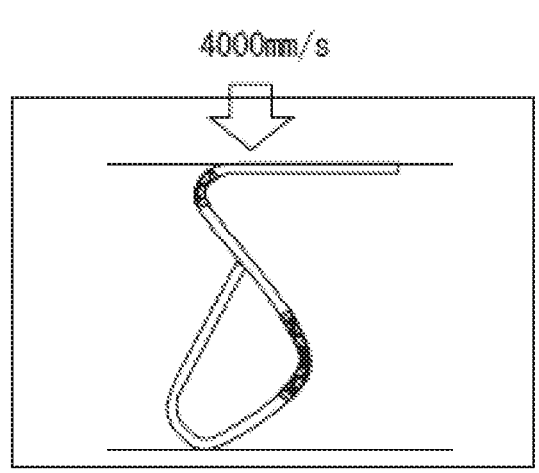

FIG. 11 shows how the hat member 10 deformed at the time of crushing in each of the simulations. Comparative example 1 shows a simulation with strength distribution type N (i.e. homogeneously high strength), while comparative example 2 shows a simulation with strength distribution type F (i.e. only the flanges softened). Inventive example 1 had strength distribution type V where the width Lt of the strength-transition portions was 1.0 times the average thickness t of the strength-transition portions (i.e. 1.0t). Inventive example 4 had strength distribution type P, where the width Lt of the strength-transition portions was 1.0 times the average thickness t of the strength-transition portions (i.e. 1.0t).

As shown in FIG. 11, each of the simulations with strength distribution types V and P exhibited a deformation behavior, i.e. member deformation mode different from those for the simulations with strength distribution types N and F. Consequently, the maximum load was larger for the simulations with strength distribution types V and P, i.e. with softened portions and strength-transition portions in the side walls 110.

Figure 12:
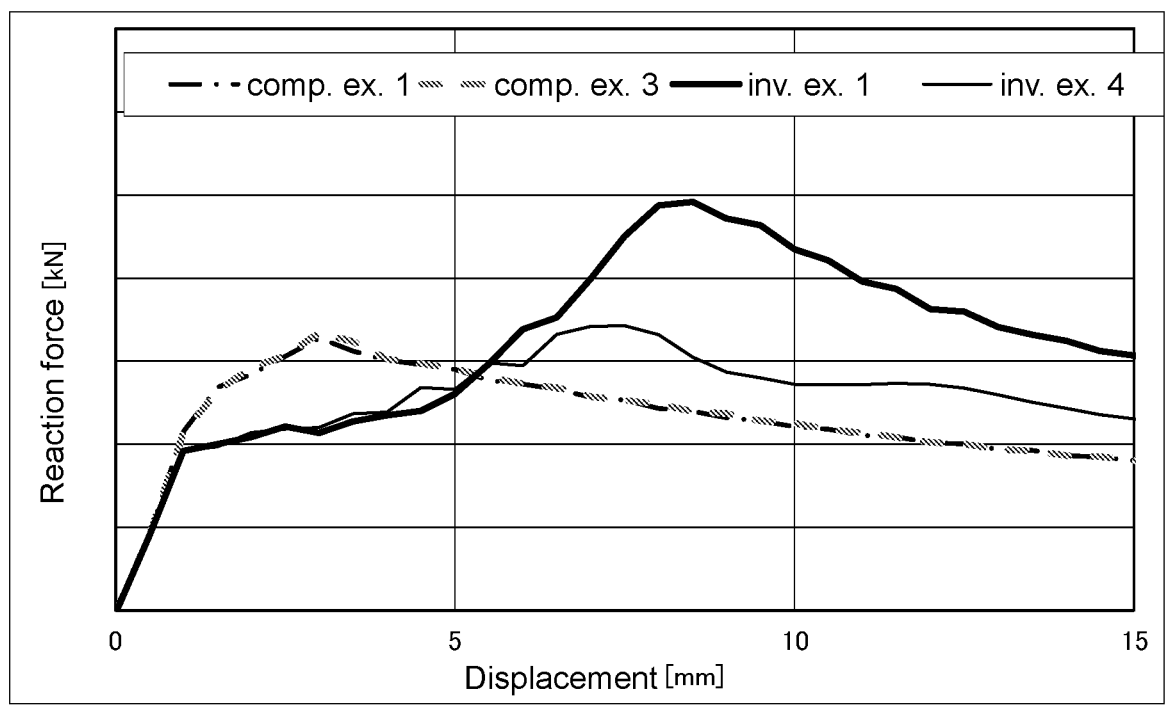
FIG. 12 is a graph showing the relationship between the amount of displacement and reaction force at the time of crushing indicated by the result of each simulation.

FIG. 12 is a graph showing the relationship between the amount of displacement and reaction force at the time of crushing indicated by the result of each simulation. As shown in FIG. 12, the conditions for comparative examples 1 and 2 and inventive examples 1 and 4 are the same as in FIG. 11. The results shown in FIG. 12 demonstrate that the amount of load that could be borne and the reaction force for each of inventive examples 1 and 4, which provided softened portions and strength-transition portions in the side walls 110, were larger than those for comparative examples 1 and 2.

Table 1, shown below, lists the conditions for, and results of, comparative examples 1 to 7 and inventive examples 1 to 6 in the simulations. In Table 1, "Distr." (strength distribution), "Wall strength trans." (strength-transition portion in side wall), "Start position of strength transition", and "length of strength transition relative to average thickness" are conditions for the simulations. In Table 1, "Max. load upon compression", "Max. load stroke", "Max. surface plastic strain at maximum load", "present/absent" for "Bend/crack" are results of the simulations. Strength distribution indicates one of strength distribution types V, P, N, A and F, discussed above. Start position of strength transition lists values of the distance between that end of a side wall which is closest to its strength-transition portion and the strength-transition portion divided by the length of the side wall. The length of the side wall is a distance between the first end and the second end of the side wall as measured along a line obtained by projecting a line perpendicular to the top-plate portion onto the surface of the side wall. That is, the start position of strength transition lists values of the distance between the end and strength-transition portion divided by the length of the side wall. The value of 0.5 indicates the middle position 110c of the side wall. The length of the strength-transition portion relative to the plate thickness is represented by the length of the strength-transition portion (i.e. the distance between the ends of the strength-transition portion measured along a line obtained by projecting a line perpendicular to the top-plate portion onto the surface of the side wall) divided by the average thickness of the strength-transition portion (i.e. the length of the strength-transition portion divided by the average thickness of the strength-transition portion). The larger the value of the maximum surface plastic strain at the maximum load, the greater the ability to bear the load becomes, but excessive values can lead to a crack. Regarding the presence/absence of a bend/crack, it is determined that a crack has occurred if the maximum surface-layer plastic strain at the maximum load was larger than 0.5.

TABLE 1

| No. | Distr. | strength-transition portion in side wall | Start position of strength-transition portion (mm/mm) | Length of strength transition relative to plate thickness (mm/mm) | Max. load upon compression kN | Max. load stroke mm | Max. surface plastic strain at max. load — | Bend/crack |
|---|---|---|---|---|---|---|---|---|
| Comp. 1 | N | absent | — | — | 18.0 | 3.0 | 0.15 | absent |
| Comp. 2 | A | absent | — | — | 15.0 | 2.5 | 0.12 | absent |
| Comp. 3 | F | absent | — | — | 17.8 | 4.5 | 0.16 | absent |
| Comp. 4 | V | present | 0.1 | 0.5 | 17.4 | 8.0 | 0.90 | present |
| Inv. 1 | V | present | 0.1 | 1.0 | 20.1 | 8.5 | 0.49 | absent |
| Inv. 2 | V | present | 0.1 | 3.0 | 23.0 | 9.0 | 0.47 | absent |
| Inv. 3 | V | present | 0.1 | 5.0 | 21.3 | 9.5 | 0.40 | absent |
| Comp. 5 | V | present | 0.1 | 6.0 | 16.0 | 9.5 | 0.34 | absent |
| Comp. 6 | P | present | 0.1 | 0.5 | 17.5 | 6.5 | 0.60 | present |
| Inv. 4 | P | present | 0.1 | 1.0 | 18.7 | 7.5 | 0.46 | absent |
| Inv. 5 | P | present | 0.1 | 3.0 | 19.0 | 8.0 | 0.43 | absent |
| Inv. 6 | P | present | 0.1 | 5.0 | 18.2 | 8.5 | 0.38 | absent |
| Comp. 7 | P | present | 0.1 | 6.0 | 16.5 | 8.5 | 0.32 | absent |

The results shown in Table 1 demonstrate that the values of maximum load for the examples with strength-transition portions in the side walls (strength distribution types (Distr.) V and P) were larger than those without strength-transition portions (strength distribution types N, A and F). Further, the maximum load was large if the length of the strength-transition portions was larger than 0.5 and smaller than 6.0.

[Molded Product]

Figure 13:
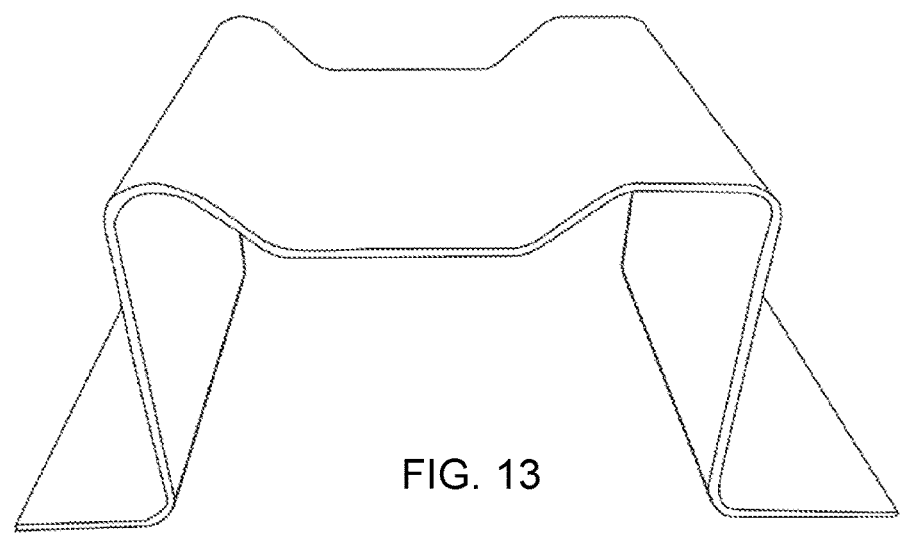
FIG. 13 is a perspective view of a molded product fabricated as an inventive example.

FIG. 13 is s perspective view of a molded product fabricated as an inventive example. The molding conditions were as follows: The material to be molded was a steel plate for HS with a post-quench strength of the grade of 2.0 GPa, with a plate thickness of 1.6 mm. For the first round of heating, to completely dissolve carbides in the material to be molded, the material to be molded was heated to 1050° C. and held isothermally for about five minutes before being loaded into a press mold to perform molding. Thereafter, the molded material was cooled to room temperature using contact heat transfer through the mold before being quenched. Then, for the second round of heating, the molded material was heated to about 900° C. and, immediately thereafter, loaded into the mold and subjected to final pressing while being quenched using the heated mold. The molded material was then brought into partial contact with the mold that had been heated to 400° C. and was heated to 379° C. using heat transfer.

Figure 14:
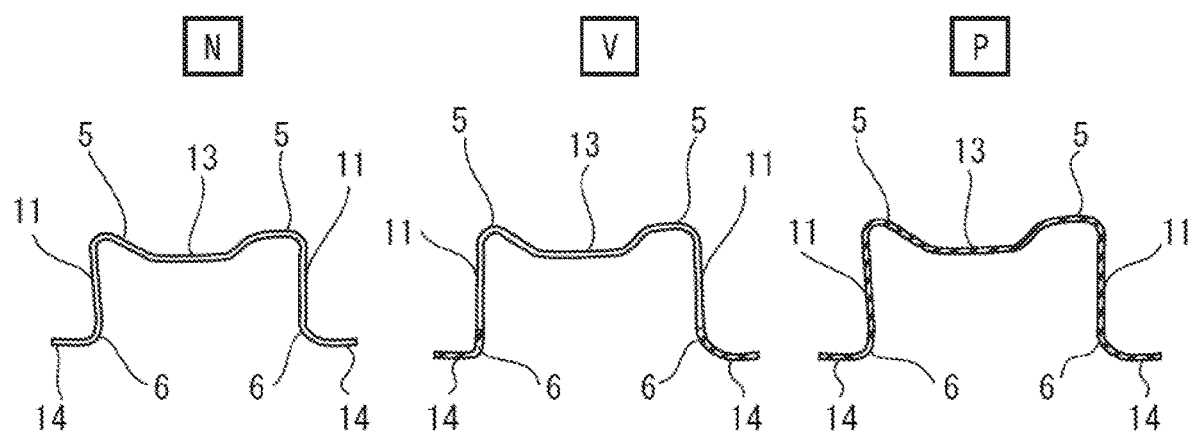
FIG. 14 illustrates strength distributions of a plurality of molded products.

A plurality of molded products having the shape shown in FIG. 13 and having different strength distributions were fabricated, and were subjected to compression testing. FIG. 14 illustrates the strength distributions in these molded products. Three strength distribution types, N, V and P, were used. Strength distribution N was the strength distribution in an as-quenched molded product, i.e. one that had not been tempered. Strength distribution V was obtained by tempering the flanges 14 and the curved portions of the side walls 11 located adjacent to the flanges 14 (corresponding to the die shoulders). A softened portion and a strength-transition portion of each side wall 11 were formed between the wall's end adjacent to the associated flange 14 and the middle position of the wall. Strength distribution P was obtained by tempering the flanges 14, the curved portions of the side walls 11 located adjacent to the flanges 4 (corresponding to the die shoulders), the curved portions of the side walls 11 located adjacent to the top-plate portion 13 (corresponding to the punch shoulders), and the inclined portions of the top-plate portion 13. A softened portion and a strength-transition portion of each side wall 11 were formed between the wall's end adjacent to the associated flange 14 and the middle position of the wall and between the side wall 11's end adjacent to the top-plate portion 13 and the middle position of the wall. For compression testing, the molded product was compressed in the direction perpendicular to the top-plate portion 13.

Table 2, provided below, shows the conditions for, and results of, comparative example 8 and inventive examples 7 and 8 of molded products. The columns in Table 2 have the same headings as in Table 1. The results shown in Table 2 demonstrate that the values of maximum load for the molded products that had been tempered to form softened portions and strength-transition portions in the side walls were larger than those for the molded products without tempering.

TABLE 2

| No. | Distr. | Strength-transition portion in side wall | Start position of strength-transition portion (mm/mm) | Length of strength-transition relative to plate thickness (mm/mm) | Max. load upon compression kN | Max. load stroke mm | Max. surface plastic strain at max. load — | Bend/crack |
|---|---|---|---|---|---|---|---|---|
| Comp. 8 | N | absent | — | — | 18.0 | 3.0 | 0.15 | absent |
| Inv. 7 | P | present | 0.0 | 1.0 | 20.1 | 4.0 | 0.48 | absent |
| Inv. 8 | V | present | 0.4 | 3.0 | 24.0 | 4.0 | 0.40 | absent |

[Exemplary Manufacture Method]

Figure 15A:
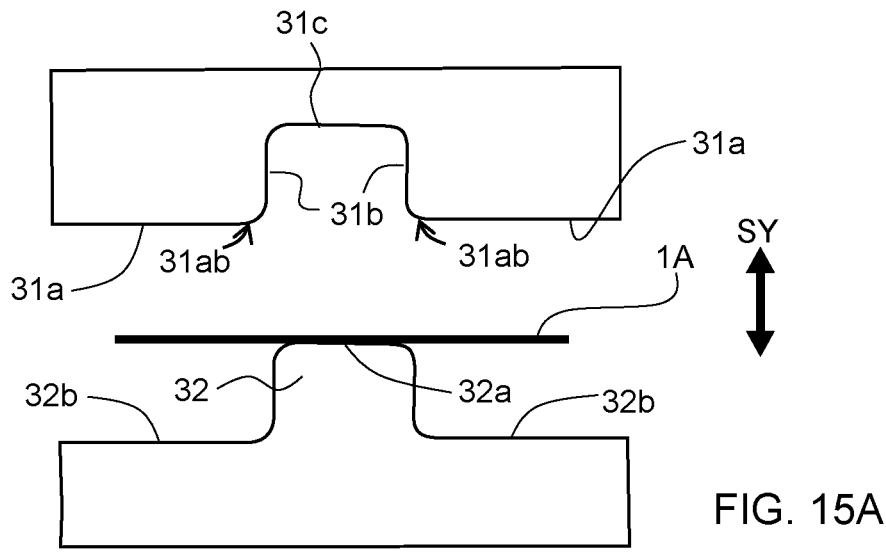
FIG. 15A shows the construction of an exemplary apparatus for press forming.
Figure 15B:
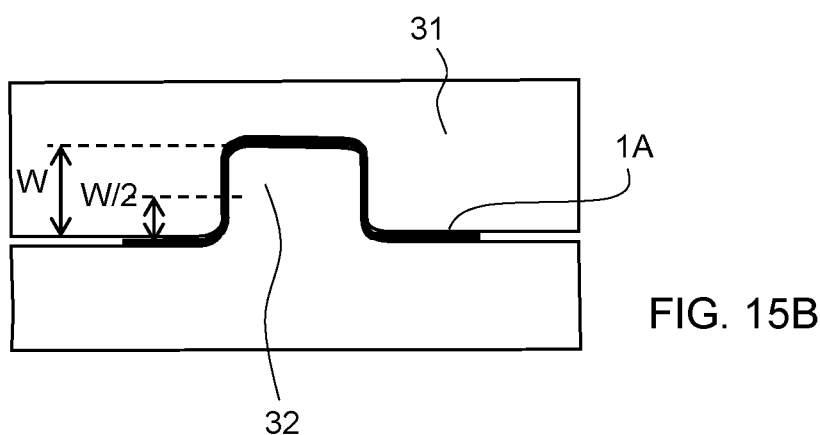
FIG. 15B shows the construction of the exemplary apparatus for press forming.

An exemplary method of manufacturing the hat member 1 using hot stamping, discussed above, will be described. In the present exemplary method, the hat member 1 is manufactured by performing press forming on a blank using a mold having a die and a punch. FIGS. 15A and 15B show an exemplary configuration of an apparatus for press forming using a die and a punch. In the exemplary configuration shown in FIGS. 15A and 15B, the mold uses a die 31 and a punch 32. The die 31 includes a recess. The recess includes a bottom 31c and lateral walls 31b. The lateral walls 31b are adjacent to the bottom 31a. The surfaces of the lateral walls 31b are inclined relative to the surface of the bottom 31c. The punch 32 reciprocates between the outside and inside of the recess of the die 31. Arrow SY indicates the directions of reciprocating movements, i.e. stroke directions, of the die 31. FIG. 15B shows the die 31 and punch 32 as positioned at the molding bottom dead center.

As shown in FIGS. 15A and 15B, a plate-shaped blank 1A is positioned between the die 31 and punch 32 during press forming. The die 31 moves toward the punch 32. At this time, the plate-holding face 32a of the punch 32 is in contact with the central portion of the blank 1A, and the central portion of the blank 1A is pushed into the recess of the die 31. When the plate-holding face 32a of the punch 32 and the die shoulders 31ab pass close by each other, the die shoulders 31ab contact the blank 1A to start the shaping of the first ridges. As shown in FIG. 15B, when the die 31 reaches the molding bottom dead center, the blank 1A fills up the gap between the punch 32 and die 31.

The plate-holding face 32a of the punch 32 is the surface at the tip of the punch 32. That is, the plate-holding face 32a of the punch is the face of the punch portion at the furthest protrusion as determined along the stroke directions, determined when the punch 32 is at the molding bottom dead center.

For hot pressing, the blank 1A, when in a heated state, is press-formed by the die 31 and punch 32. The heating of the blank 1A may be electric heating, for example. The electric heating is performed by positioning the blank 1A between the die 31 and punch 32 and, with this condition kept, attaching electrodes to the blank 1A to pass electric current. Alternatively, the blank 1A may be heated by a heating furnace and then positioned between the die 31 and punch 32 to be pressed.

Controlling the heating temperature of the blank 1A and the relative velocity between the die 31 and punch 32 during press forming enables manufacturing of a hat member having softened portions and strength-transition portions as described above.

In one exemplary method, the blank 1A may be heated and kept soaked at a temperature of 900° C. or higher for one minute or longer. Thereafter, when the temperature of the blank 1A, in contact with the die shoulders 31ab, is not lower than 600° C. and not higher than 800° C., the die shoulders 31ab and the plate-holding face 32a of the punch 32 are caused to pass close by each other to form the first ridges 113. Further, when the temperature of the blank 1A, in contact with the position on each lateral wall 31b of the die 31 of half the wall's height (W/2), is not lower than 300° C. and not higher than 700° C., each die shoulder 31ab and the plate-holding face 32a of the punch 32 are caused to pass close by each other to form the first ridges 113, and the position on each lateral wall 31b of the die 31 of half the wall's height (W/2) and the plate-holding face 32a of the punch 32 are caused to pass close by each other. Thus, a hat member including softened portions L and strength-transition portions T as described above can be manufactured by hot pressing. In this case, the tempering step for forming the softened portions L and strength-transition portions T is unnecessary.

As shown in FIG. 15B, the height W of the lateral walls 31b of the die 31 is defined as the distance, as measured in the stroke directions, between the position of the plate-holding face 32a of the punch 32 and the position of the die shoulders 31ab found when the die and punch are at the molding bottom dead center.

Further, during hot pressing, it is possible to reduce the average relative velocity V2 between the die 31 and punch 32 after the position on each lateral wall 31b of the die 31 of half the wall's height (W/2) and the plate-holding face 32a of the punch 32 pass close by each other until the plate-holding face 32 of the punch 32 reaches the molding bottom dead center. This enables forming a softened portion L and a strength-transition portion T between the middle position 11c of each wall 11 and the associated second ridge 114 of the hat member being molded. For example, it is preferable to control the velocity of the punch 32 such that the relationship between the relative velocity V1 between the die and punch found when each die shoulder and the plate-holding face of the punch pass close by each other, on one hand, and the above-discussed average relative velocity V2, on the other, meets Expression (1) provided below. This enables efficient formation of the softened portions L and strength-transition portions T.

$$V2/V1 < 0.05 \qquad (1).$$

The above-discussed velocity control is an example that may be used if no insulator is provided between the plate-holding face 31a of the die 31 and the face 32b of the punch 32 that faces it, that is, if the thermal conductivity of the die 31 and punch 32 is higher than 0.3 (W/m·K).

An insulator with a thermal conductivity of 0.3 (W/m·K) or lower may be provided on at least one of the plate-holding face 31a of the die 31 and the face 32b of the punch 32 that faces it. In such implementations, for example, it is preferable to control the velocity of the punch 32 such that the relationship between V1 and V2 satisfies Expression (2), provided below. This enables yet more efficient formation of the softened portions L and strength-transition portions T.

$$0.05 \leq V2/V1 \leq 0.5 \qquad (2).$$

Further, the temperature of the die 31 or punch 32 may be controlled such that, after the plate-holding face 32a of the punch 32 passes close by the position on each lateral wall 31b of the die 31 of half the wall's height (W/2) and until the punch plate-holding face reaches the bottom dead center, the blank 1A contacts the plate-holding face 31a of the die 31 at 300° C. or higher or the face 32b of the punch 32, at 300° C. or higher, that faces the plate-holding face 31a of the die 31. In such implementations, for example, it is preferable to control the velocity of the punch 32 such that the relationship between V1 and V2 satisfies Expression (2) provided above. This enables yet more efficient formation of the softened portions L and strength-transition portions T. Alternatively, both the plate-holding face 31a of the die 31 at 300° C. or higher and the face 32b of the punch 32 that faces the plate-holding face 31a of the die 31 at 300° C. or higher may contact the blank 1A after the plate-holding face 32a of the punch 32 passes close by the position on each lateral wall 31b of the die 31 of half the wall's height (W/2) and until the punch plate-holding face reaches the batten dead center.

Figure 16A:
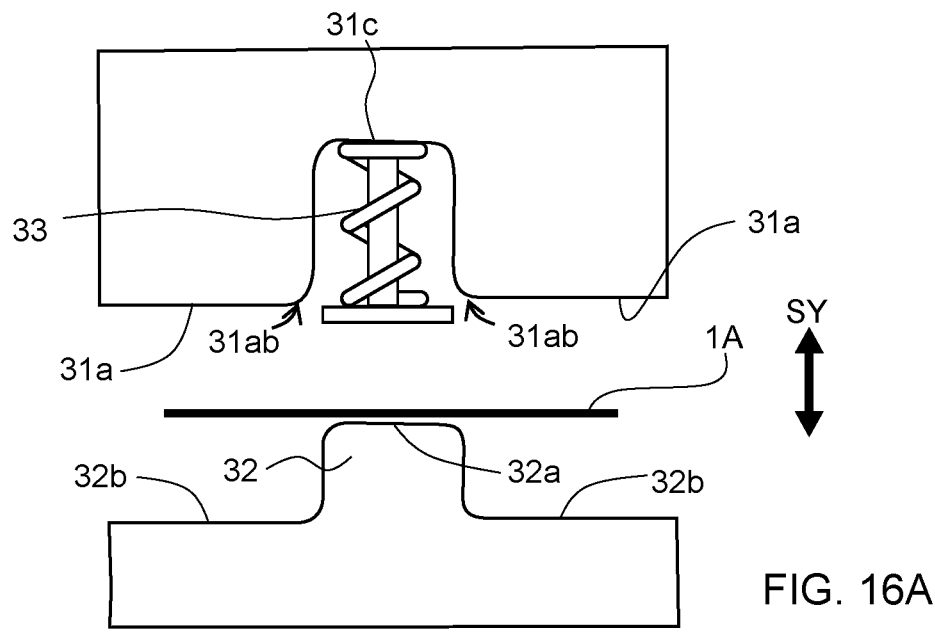
FIG. 16A shows the construction of another exemplary apparatus for press forming.
Figure 16B:
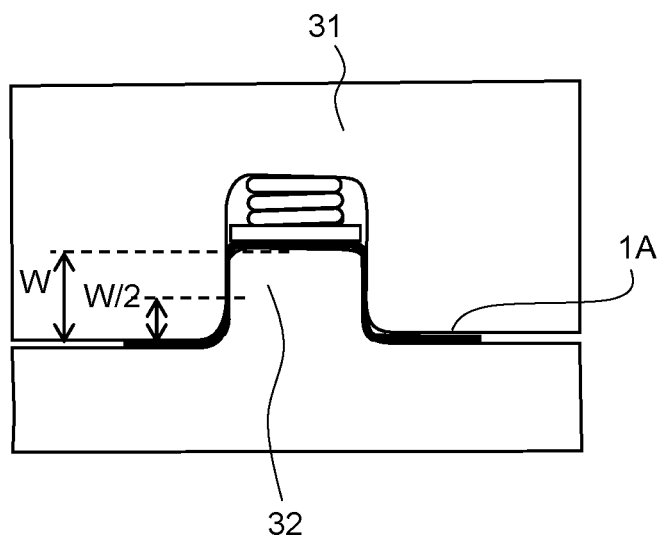
FIG. 16B shows the construction of the exemplary apparatus for press forming.

FIGS. 16A and 16B show a variation of the apparatus for press forming using a die and a punch. In the exemplary configuration shown in FIGS. 16A and 16B, a sheet holder 33 is mounted on the die 31. The sheet holder 33 includes an elastic member attached to the bottom 31c of the recess of the die 31 and a push plate attached to the tip of the elastic member. The push plate is pressed against the blank 1A during press forming.

Specifically, during press forming, the central portion of the blank 1A is pressed between the plate-holding face 32a of the punch 32 and the push plate of the sheet holder 33. With this condition kept, the punch 32 is inserted into the recess of the die 31.

Again, as shown in FIG. 16B, the height W of the lateral walls 31b of the die 31 is defined as the distance, as measured in the stroke directions, between the position of the plate-holding face 32a of the punch 32 and the position of the die shoulders 31ab found when the punch and die are at the molding bottom dead center.

[Exemplary Velocity Control]

Figure 17:
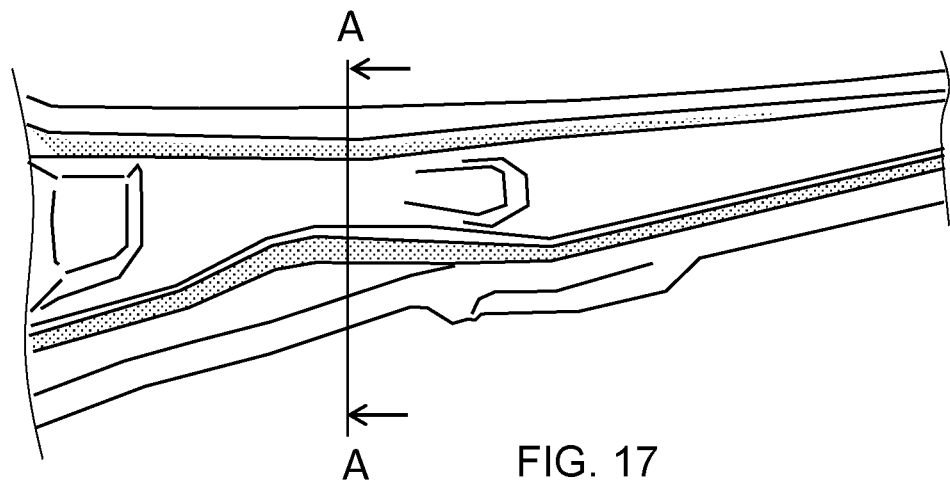
FIG. 17 is a top view of a model product of a center pillar.
Figure 18:
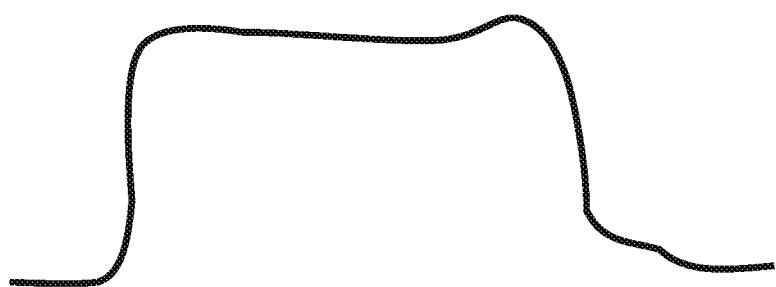
FIG. 18 is a cross-sectional view of the product taken along line A-A shown in FIG. 17.
Figure 19:
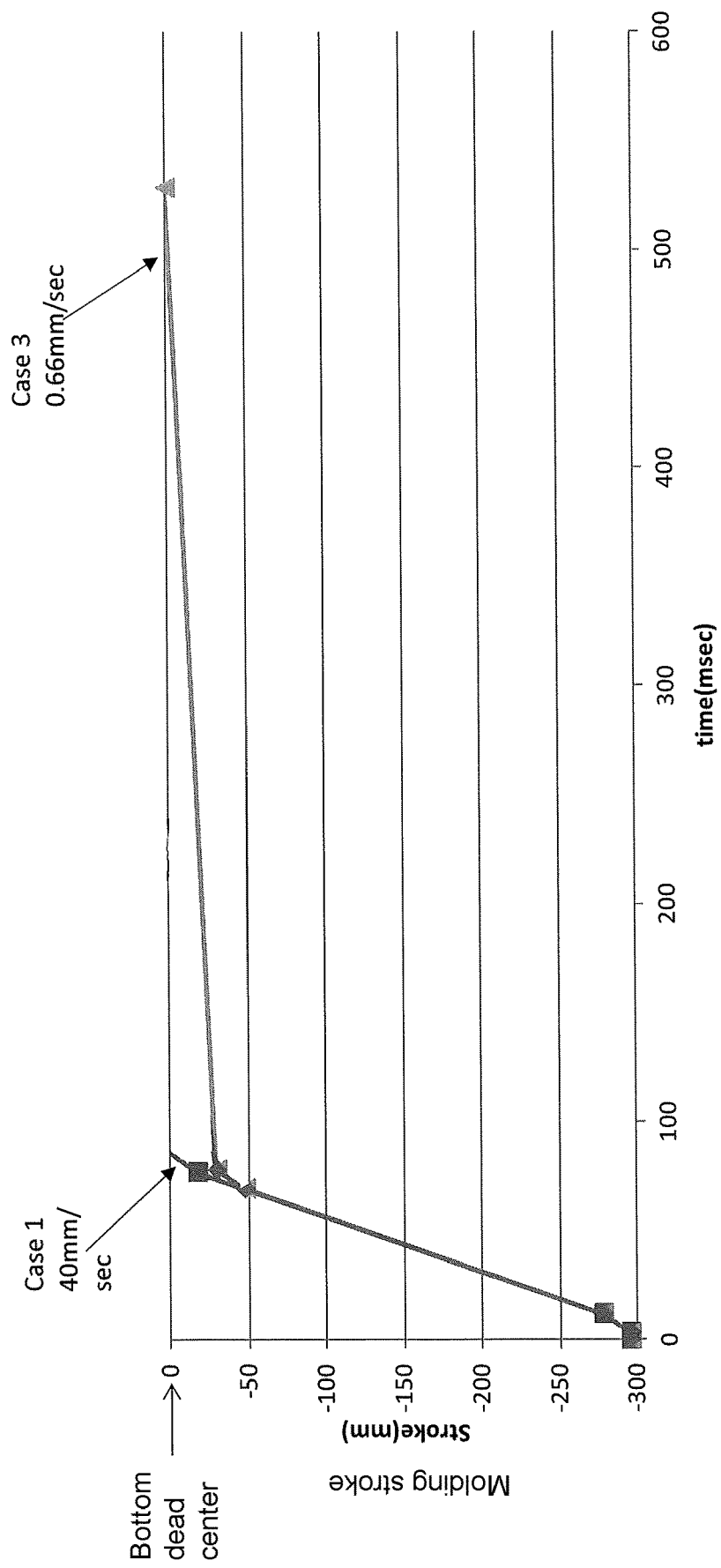
FIG. 19 is a graph showing three patterns of punch velocity.

The hot pressing process of a model product of a center pillar, shown in FIGS. 17 and 18, was analyzed. FIG. 17 is a top view of the model product. FIG. 18 is a cross-sectional view of the product taken along line A-A of FIG. 17. The model product had a hat-shaped cross section. The height of the model product after molding was 75 mm. For each of three patterns of the velocity of the punch relative to the die, the hot pressing was analyzed and the hardness distribution in the cross section as shown in FIG. 18 was measured. FIG. 19 is a graph showing the three velocity patterns. In the graph of FIG. 19, the vertical axis represents the stroke of the die during molding, where zero means the bottom dead center, and the horizontal axis represents time. For Case 1, molding was performed by moving the die at a constant velocity of 40 mm/s for the entire stroke. For Case 2, molding was performed with a velocity of 50 mm/s from the beginning of the stroke until a position 30 mm before the bottom dead center, where the distance between the position 30 mm before the bottom dead center and the bottom dead center required 15 seconds. The velocity for the last 30 mm for Case 2 was 2 mm/s. For Case 3, molding was performed with a velocity of 40 mm/s from the beginning of the stroke until a position 30 mm before the bottom dead center, where the last 30 mm of the stroke of the punch required 45 seconds. The velocity for the last 30 mm for Case 3 was 0.66 mm/s.

Figure 20:
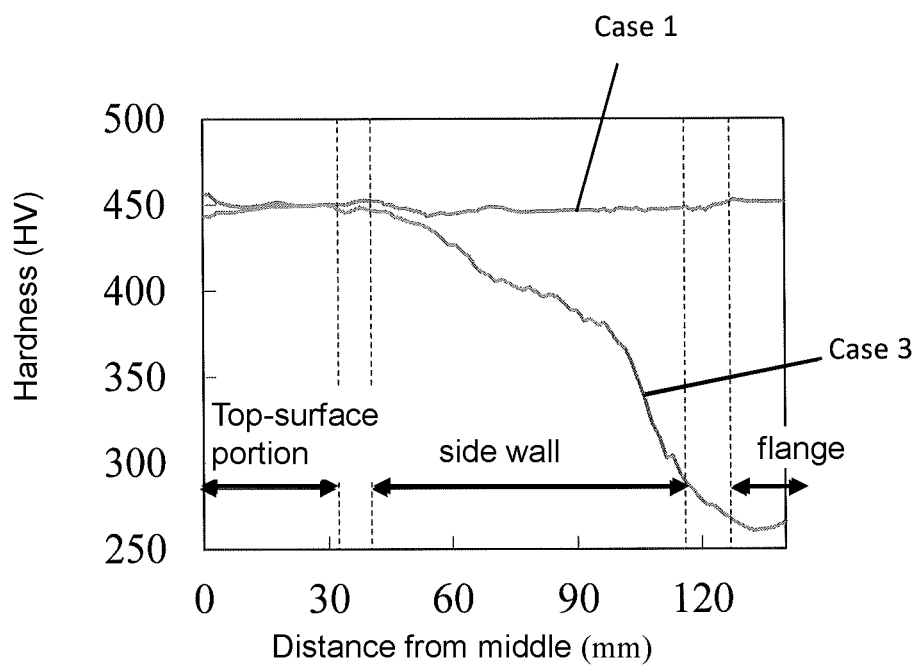
FIG. 20 is a graph showing the hardness distributions of model products.

FIG. 20 is a graph showing the hardness distribution in the model product created under the conditions of each of Cases 1 to 3, as seen in the cross section of FIG. 18. For Case 1, the hardness was generally constant from the side wall toward the flange. For Case 3, there were differences in hardness from the side wall toward the flange. That is, softened portions and strength-transition portions were formed. Although not shown, softened portions and strength-transition portions were also formed for Case 2. In this analysis, too, softened portions and strength-transition portions were formed within the range of V1/V2<0.05.

Although embodiments of the present invention have been described, the above-illustrated embodiments are merely examples for carrying out the present invention. Thus, the present invention is not limited to the above-illustrated embodiments, and the above-illustrated embodiments can be modified as appropriate without departing from the spirit of the invention to be carried out.

EXPLANATION OF CHARACTERS

1: hat member
11: side walls
13: top-plate portion
14: flanges
L: softened portion
T: strength-transition portion

The invention claimed is:

1. A hat member comprising:
a top-plate portion;
two first ridges each positioned on a respective one of both ends of the top-plate portion;
two side walls each extending from a first end adjacent to the associated first ridge to a second end in a direction with an angle of 90° to 135° relative to the top-plate portion,
the two side walls each having a middle hardness Dc of 300 HV or higher, where the middle hardness is defined as the lower one of the hardnesses of the two side walls as measured at their middle positions as determined along a direction perpendicular to the top-plate portion,
the two side walls each including a softened portion and a strength-transition portion adjacent to the softened portion,
the softened portion extending from the second end to a position before the middle position,
the softened portion having a hardness Dn lower than the middle hardness Dc by at least 8%,
the strength-transition portion extending 0.5 mm or longer from the softened portion toward the first end and located closer to the second end than a middle between the first end and the second end,
the strength-transition portion having a hardness Dt transitionally changing in a range of 8% to 1% lower than the middle hardness ($0.92Dc \leq Dt \leq 0.99Dc$);
two second ridges each adjacent to the second end of the associated one of the two side walls; and
two flanges extending away from each other from the respective second ridges.

2. The hat member according to claim 1, wherein a width of the strength-transition portion as measured between the end closer to the first ridge and the end closer to the second ridge is not larger than five times an average thickness of the strength-transition portion.

3. A manufacture method for manufacturing the hat member according to claim 1 by performing press forming on a blank using a punch and a die, the method comprising:
heating the blank to 900° C. or higher and soaking and holding the blank at 900° C. or higher for one minute or longer;
forming the first ridges by causing a die shoulder of the die and a plate-holding face of the punch to pass close by each other when the blank, in contact with the die shoulder, is at a temperature not lower than 600° C. and not higher than 800° C.; and
causing a position on the die at a height of half that of a lateral wall of the die and the plate-holding face of the punch to pass close by each other when the blank, in contact with the position on the die at a height of half that of the lateral wall of the die, is at a temperature not lower than 300° C. and not higher than 700° C.

4. A manufacture method for manufacturing the hat member according to claim 1 by performing press forming on a blank using a punch and a die, the method comprising:
heating the blank to 900° C. or higher and soaking and holding the blank at 900° C. or higher for one minute or longer;
forming the first ridges by causing a die shoulder of the die and a plate-holding face of the punch to pass close by each other; and forming the second ridges by causing a position on the die at a height of half that of a lateral wall of the die and the plate-holding face of the punch to pass close by each other, wherein an average relative velocity V2 between the die and the punch after the position on the die at a height of half that of the lateral wall of the die and the plate-holding face of the punch pass close by each other until the plate-holding face of the punch reaches a molding bottom dead center is smaller than one twentieth of a relative velocity V1 between the die and the punch found when the die shoulder and the plate-holding face of the punch pass close by each other.

5. A manufacture method for manufacturing the hat member according to claim 1 by performing press forming on a blank using a punch and a die, comprising:

heating the blank to 900° C. or higher and soaking and holding the blank at 900° C. or higher for one minute or longer;

forming the first ridges by causing a die shoulder of the die and a plate-holding face of the punch to pass close by each other; and forming the second ridges by causing a position on the die at a height of half that of a lateral wall of the die and the plate-holding face of the punch to pass close by each other, wherein an insulator with a thermal conductivity of 0.3 (W/m·K) or lower is provided, the insulator being located on a face of the punch positioned to face a plate-holding face of the die or on the plate-holding face of the die, and the blank contacts the insulator after the position on the die at a height of half that of the lateral wall of the die and the plate-holding face of the punch pass close by each other by a time at which the plate-holding face of the punch reaches a molding bottom dead center, and an average relative velocity V2 between the die and the punch after the position on the die at a height of half that of the lateral wall of the die and the plate-holding face of the punch pass close by each other until the plate-holding face of the punch reaches the molding bottom dead center is not smaller than one twentieth and not larger than one half of a relative velocity V1 between the die and the punch found when the die shoulder and the plate-holding face of the punch pass close by each other.

6. A manufacture method for manufacturing the hat member according to claim 1 by performing press forming on a blank using a punch and a die, comprising:

heating the blank to 900° C. or higher and soaking and holding the blank at 900° C. or higher for one minute or longer;

forming the first ridges by causing a die shoulder of the die and a plate-holding face of the punch to pass close by each other; and forming the second ridges by causing a position on the die at a height of half that of a lateral wall of the die and the plate-holding face of the punch pass close by each other, wherein the blank contacts a face of the punch positioned to face a plate-holding face of the die and being at not lower than 300° C. or the plate-holding face of the die being at not lower than 300° C. after the position on the die at a height of half of the lateral wall of the die and the plate-holding face of the punch pass close by each other by a time at which the plate-holding face of the punch reaches a molding bottom dead center, and an average relative velocity V2 between the die and the punch after the position on the die at a height of half that of the lateral wall of the die and the plate-holding face of the punch pass close by each other until the plate-holding face of the punch reaches the molding bottom dead center is not smaller than one twentieth and not larger than one half of a relative velocity V1 between the die and the punch found when the die shoulder and the plate-holding face of the punch pass close by each other.

* * * * *